US008947681B2

(12) United States Patent
Matsushita et al.

(10) Patent No.: US 8,947,681 B2
(45) Date of Patent: Feb. 3, 2015

(54) INSERTION SYSTEM AND INSERTION METHOD

(75) Inventors: Shingo Matsushita, Tokyo (JP); Takeshi Sasaki, Kanagawa (JP); Satoshi Saito, Kanagawa (JP); Ikuhisa Okamoto, Kanagawa (JP); Junichi Tokita, Kanagawa (JP); Akira Kunieda, Tokyo (JP); Takahiro Watanabe, Kanagawa (JP); Jun Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 317 days.

(21) Appl. No.: 13/301,995

(22) Filed: Nov. 22, 2011

(65) Prior Publication Data

US 2012/0131885 A1 May 31, 2012

(30) Foreign Application Priority Data

Nov. 26, 2010 (JP) ................................ 2010-263583

(51) Int. Cl.
*B65B 7/00* (2006.01)
*B65B 61/20* (2006.01)
*B65B 7/28* (2006.01)
(Continued)

(52) U.S. Cl.
CPC .................................... *B43M 3/045* (2013.01)
USPC .......... 358/1.12; 53/381.5; 53/284.3; 53/252; 53/569; 271/2; 271/214; 271/215; 271/181; 700/220; 700/222; 700/223; 705/401

(58) Field of Classification Search
USPC ........... 700/222, 223; 271/119, 245; 705/401, 705/317; 53/284.3, 252, 569, 460
See application file for complete search history.

(56) References Cited

U.S. PATENT DOCUMENTS 3,253,384 A * 5/1966 Huck et al. ........................ 53/53
4,733,856 A * 3/1988 Gunther, Jr. ................ 270/1.02
(Continued)

FOREIGN PATENT DOCUMENTS

JP 05032231 A 2/1993
JP 2003263477 A 9/2003
(Continued)

OTHER PUBLICATIONS

Abstract of JP 05-032231 published Feb. 9, 1993.
(Continued)

*Primary Examiner* — Akwasi M Sarpong
(74) *Attorney, Agent, or Firm* — Harness, Dickey & Pierce P.L.C.

(57) ABSTRACT

An insertion system includes an enclosure supply device, an envelope supply device, an insertion device to insert an enclosure supplied from the enclosure supply device into the envelope supplied from the envelope supply device, a first input unit to input identification data of the enclosure inserted into the envelope in each of multiple insertion setting records, a second input unit to input identification data of the enclosure set in the enclosure container of the enclosure supply device, and a controller to determine whether the identification data of the enclosure to be inserted, input by the first input unit, matches the identification data of the enclosure set in the enclosure container, input by the second input unit, and to control supply of the envelope by the envelope supply device as well as supply of the enclosure by the enclosure supply device based on a result of the determination.

14 Claims, 17 Drawing Sheets

(51) Int. Cl.

| | |
|---|---|
| ***G06F 7/00*** | (2006.01) |
| ***G06F 17/00*** | (2006.01) |
| ***B43M 3/04*** | (2006.01) |

(56) References Cited

U.S. PATENT DOCUMENTS

| | | | | |
|---|---|---|---|---|
| 4,739,606 | A * | 4/1988 | Cantile | 53/493 |
| 4,817,368 | A * | 4/1989 | DePasquale et al. | 53/460 |
| 4,875,174 | A * | 10/1989 | Olodort et al. | 715/201 |
| 5,819,666 | A * | 10/1998 | Ishikawa et al. | 101/483 |
| 6,311,104 | B1 * | 10/2001 | Shea et al. | 700/222 |
| 6,755,411 | B2 * | 6/2004 | Janatka et al. | 271/2 |
| 6,959,923 | B2 * | 11/2005 | Leitz et al. | 271/214 |
| 6,997,454 | B2 * | 2/2006 | Antonelli et al. | 271/214 |
| 7,149,726 | B1 * | 12/2006 | Lingle et al. | 705/411 |
| 7,155,878 | B2 * | 1/2007 | Stemmle et al. | 53/381.5 |
| 7,188,459 | B2 * | 3/2007 | Brauneis et al. | 53/284.3 |
| 7,226,494 | B1 * | 6/2007 | Schwartz et al. | 75/401 |
| 7,231,750 | B2 * | 6/2007 | Woodman et al. | 53/429 |
| 7,236,935 | B2 * | 6/2007 | Haydt, III | 705/317 |
| 7,280,888 | B2 * | 10/2007 | Edel et al. | 700/220 |
| 7,637,490 | B2 * | 12/2009 | Kapturowski et al. | 270/58.06 |
| 7,818,269 | B2 * | 10/2010 | Ogg et al. | 705/408 |
| 2002/0023057 | A1 * | 2/2002 | Goodwin et al. | 705/50 |
| 2004/0080099 | A1 * | 4/2004 | Janatka et al. | 271/245 |
| 2006/0200429 | A1 * | 9/2006 | Edel et al. | 705/401 |
| 2007/0164496 | A1 * | 7/2007 | Kapturowski et al. | 270/52.01 |
| 2009/0257846 | A1 * | 10/2009 | Matsushita et al. | 412/6 |
| 2010/0226733 | A1 | 9/2010 | Ilda et al. | |
| 2010/0239391 | A1 | 9/2010 | Sasaki et al. | |
| 2010/0329821 | A1 | 12/2010 | Sasaki et al. | |
| 2011/0277418 | A1 | 11/2011 | Kunieda et al. | |

FOREIGN PATENT DOCUMENTS

| | | | |
|---|---|---|---|
| JP | 2007008653 | A | 1/2007 |
| JP | 2007008653 | A * | 1/2007 |

OTHER PUBLICATIONS

Abstract of JP 2003-263477 published Sep. 19, 2003.
Abstract of JP 2007-008653 published Jan. 18, 2007.

* cited by examiner

INSERTION SYSTEM AND INSERTION METHOD

CROSS-REFERENCE TO RELATED APPLICATIONS

This patent application is based on and claims priority pursuant to 35 U.S.C. §119 to Japanese Patent Application No. 2010-263583, filed on Nov. 26, 2010, in the Japan Patent Office, the entire disclosure of which is hereby incorporated herein by reference.

FIELD OF THE INVENTION

The present invention generally relates to an insertion system that inserts sheets in envelopes and a method for inserting sheets in envelopes.

BACKGROUND OF THE INVENTION

Independent insertion devices controlled off-line from image forming apparatuses are known. Such insertion devices are capable of insertion of a large amount of enclosures on which the image forming apparatuses form images into designated envelopes.

JP-2007-008653-A proposes an insertion system that inserts sealed sub-envelopes that contain enclosures as well as other enclosures into main envelopes. The insertion system includes multiple enclosure feeding units arranged serially along conveying means in the direction in which enclosures are transported. To accommodate different types of enclosures, the number of enclosure feeding units is identical to the number of enclosure types.

However, in the above-described system in which the insertion device is controlled off-line from the image forming apparatus, image formation on enclosures and insertion of those enclosures in envelopes are performed by separate devices. Accordingly, it is necessary to set enclosures as well as envelopes and input insertion procedure for each combination of enclosures and envelopes. Therefore, in the case of small lots, frequency of setting of enclosures as well as envelopes in the device and input of insertion procedure is high, increasing down time.

In view of the foregoing, various approaches are tried. To eliminate the down time in small-lot insertion processing, for example, the image forming apparatus and the insertion device may be controlled online so that the printed enclosures and envelopes can be transported from the image forming apparatus to the insertion device. In this configuration, preparation of enclosures on which images are formed and insertion of enclosures into envelopes can be performed in succession.

This system, however, has a drawback when there are enclosures other than those output from the image forming apparatus. More specifically, although an inserter or enclosure supply device is used to feed such enclosures to the insertion device, the number of feed cassettes of the enclosure supply device is small compared with the size of the device. Therefore, when the number of enclosure types is greater than the number of feed cassettes of the enclosure supply device, it is necessary to divide a single job and change the enclosure type set in the enclosure supply device for each divided job, or it is necessary to visually check the combination of enclosures and envelopes. Therefore, operability as well as productivity in insertion of enclosures into envelopes is reduced.

Additionally, because a single enclosure feeding unit contains only a single type of enclosure in the above-described system proposed in JP-2007-008653-A, when the number of enclosure types is greater than the number of enclosure feeding units, insertion of different enclosure types cannot be completed in a single job, and thus the job must be divided. Although the number of enclosure feeding units may be increased so that insertion of different enclosure types can be completed in a single job, doing so increases the size of the system in the dimension along which enclosures are transported, which is not desirable.

BRIEF SUMMARY OF THE INVENTION

In view of the foregoing, one embodiment of the present invention provides an insertion system that includes an enclosure supply device including an enclosure container, to transport enclosures from the enclosure container, an envelope supply device including an envelope container, to transport envelopes from the envelope container, and an insertion device to insert the enclosure supplied from the enclosure supply device into the envelope supplied from the envelope supply device. The insertion system further includes a first input unit to input identification data of the enclosure to be inserted into the envelope for a respective one of multiple insertion setting records, a second input unit to input identification data of the enclosure set in the enclosure container of the enclosure supply device, and a controller. The controller determines whether the identification data of the enclosure to be inserted, input by the first input unit matches the identification data of the enclosure set in the enclosure container, input by the second input unit, and controls supply of the envelope by the envelope supply device as well as supply of the enclosure by the enclosure supply device based on a result of the determination.

Another embodiment provides an insertion method including a step of storing multiple insertion setting records in a memory unit communicably connected to a processor, a step of selecting envelope type in each insertion setting record, a step of inputting image data of an image formed on an envelope in each insertion setting record, a step of inputting identification data of an enclosure to be inserted in the envelope in each insertion setting record, a step of determining whether the identification data of the enclosure to be inserted matches identification data of enclosures set in an enclosure container for the respective one of the multiple insertion setting records, and a step of changing an output order of the multiple insertion setting records based on whether the identification data of the enclosure to be inserted matches the identification data of the enclosures set in the enclosure container.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
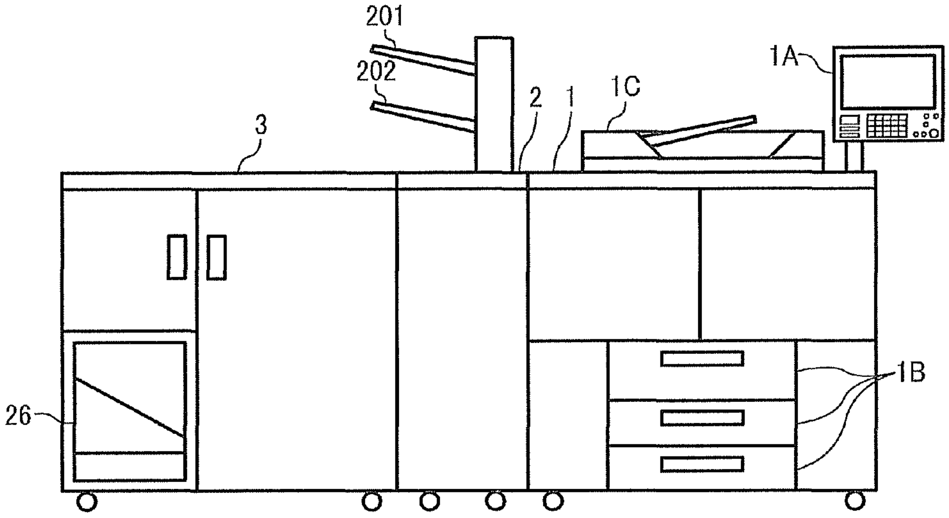
FIG. 1 is a front view illustrating a configuration of an image forming system according to an illustrative embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an image forming system according to an embodiment of the present invention is described.

FIG. 1 is a front view illustrating a configuration of the image forming system according to an embodiment of the present invention. In FIG. 1, the image forming system according to the present embodiment includes an image forming apparatus 1 serving as an envelope supply device, an enclosure supply device (inserter) 2 to supply sheets to be inserted in envelopes (hereinafter "enclosures"), and an insertion device or enclosing device 3. Above the image forming apparatus 1, a control panel 1A and an automatic document feeder (ADF) 1C are provided. The control panel 1A includes a display 900 (shown in FIG. 12). Additionally, multiple feed cassettes 1B are provided beneath the image forming apparatus 1. At least one of the multiple feed cassettes 1B serves as an envelope container in which envelopes are stored.

The enclosure supply device 2 is connected to a discharge side of the image forming apparatus 1. A first inserter cassette (inserter upper cassette) 201 and a second inserter cassette (inserter lower cassette) 202 are mounted on the enclosure supply device 2. The inserter upper cassette 201 and inserter lower cassette 202 store enclosures such as sheets to be inserted in envelopes.

The insertion device 3 is connected to a discharge side of the enclosure supply device 2 and includes a stack tray 26 to accommodate envelopes after enclosures are inserted therein.

For example, the image forming apparatus 1 is a multifunction peripheral (MFP).

In the above-described image forming system, envelopes are set in the feed cassette 1B of the image forming apparatus 1, and enclosures are set in the first and second inserter cassettes 201 and 201. While the image forming apparatus 1 forms images on the envelopes and forwards them to the insertion device 3, the enclosure supply device 2 transports the enclosures to the insertion device 3. Then, the insertion device 3 inserts the enclosures in the envelopes, after which the envelopes are discharged to the stack tray 26.

It is to be noted that, although only envelopes are supplied from the feed cassette 1B of the image forming apparatus 1 in the present embodiment, the object stored in the feed cassette 1B is not limited thereto. For example, the feed cassette 1B may store sheets, and the image forming apparatus 1 may form images on them as enclosures, after which the insertion device 3 may insert the enclosure on which an image is formed in an envelope.

Figure 2:
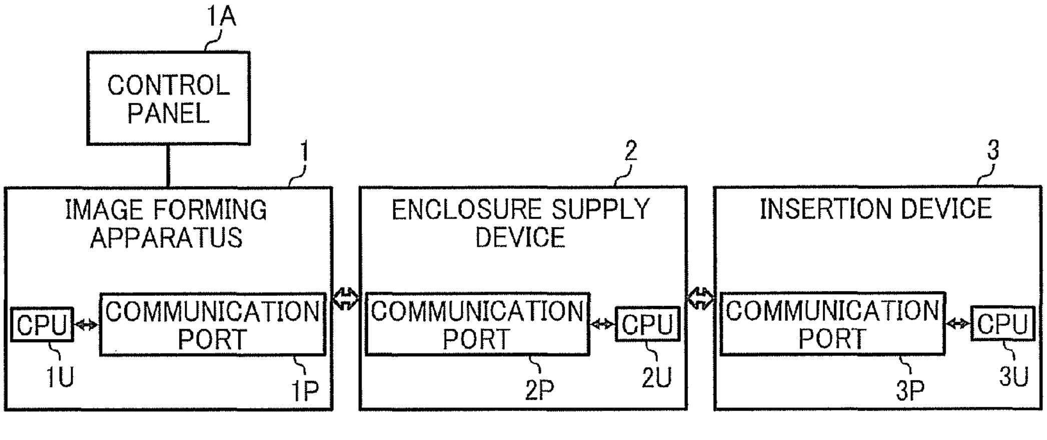
FIG. 2 is a block diagram illustrating a configuration of a control system of the image forming system.

FIG. 2 is a block diagram illustrating a schematic configuration of a control system of the image forming system shown in FIG. 1.

Referring to FIG. 2, in the image forming system according to the present embodiment, the enclosure supply device 2 as well as the insertion device 3 is connected to the image forming apparatus 1 to enable online control of the devices. The image forming apparatus 1, the enclosure supply device 2, and the insertion device 3 respectively include central processing units (CPUs) 1U, 2U, and 3U, and storage units (memory units) such as random-access memories (RAMs). Additionally, the image forming apparatus 1 includes a communication port 1P, the enclosure supply device 2 includes a communication port 2P, and the insertion device 3 includes a communication port 3P. The image forming apparatus 1, the enclosure supply device 2, and the insertion device 3 can communicate with each other via the communication ports 1P, 2P, and 3P. The control panel 1A is connected to the image forming apparatus 1 via an interface (I/F) and displays various indications described later, instructed by the CPU 1U of the image forming apparatus 1. Users can input instructions or data into the image forming apparatus 1 by pressing keys on the control panel 1A or touching the display 900.

The control panel 1A cooperates with the CPU 1U and serves as a first input unit to input identification data (e.g., classification codes, types, and the like) of enclosures inserted in envelopes as well as a second input device to input identification data of enclosures set in the inserter upper cassette 201 and the inserter lower cassette 202.

Figure 3:
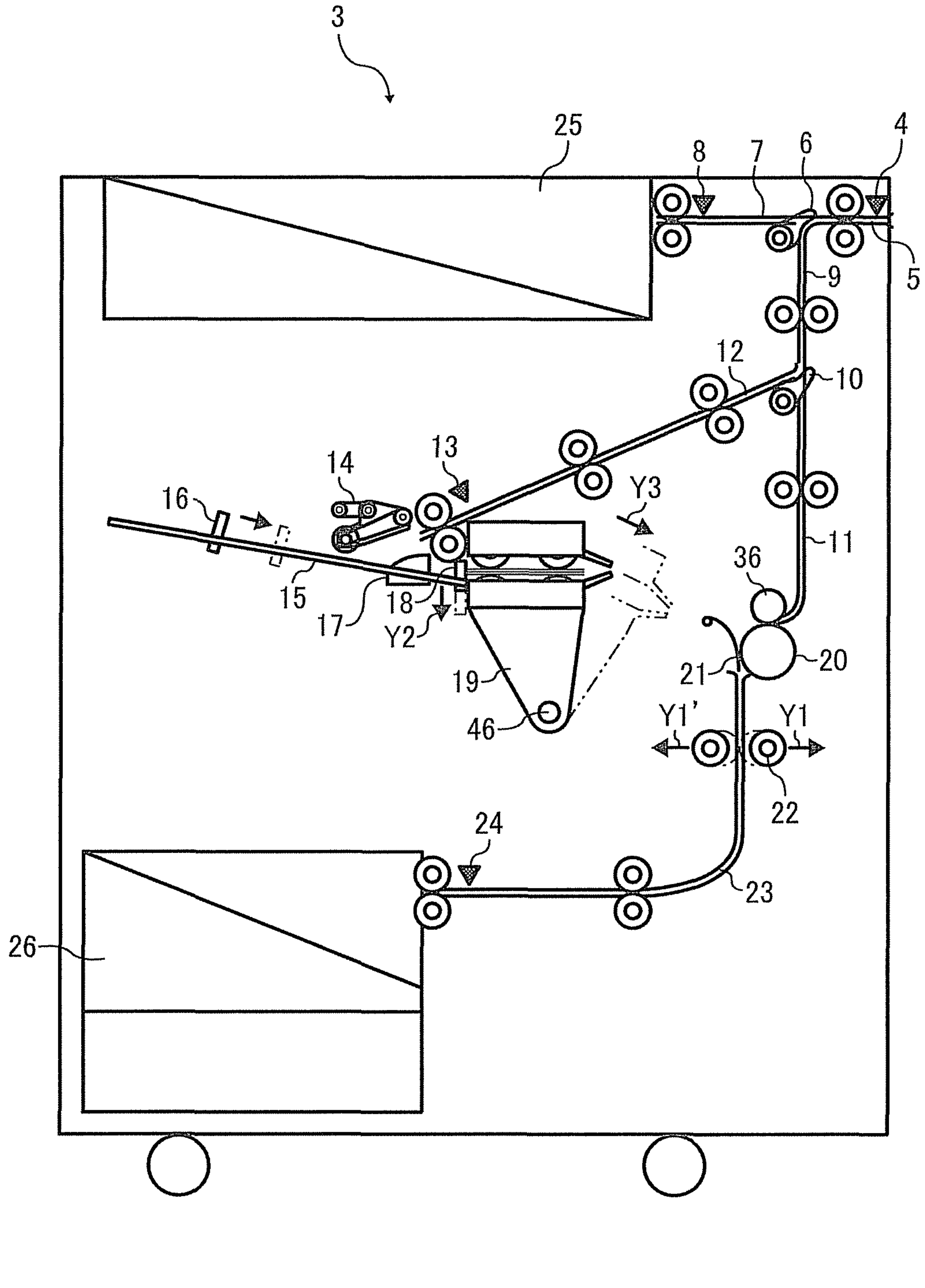
FIG. 3 illustrates an interior of an insertion device included in the image forming system.

FIG. 3 illustrates an interior of the insertion device 3 according to the present embodiment.

The envelopes set in the feed cassette 1B of the image forming apparatus 1 are fed to an image forming unit inside the image forming apparatus 1, and the image forming unit prints addresses and the like on the envelopes, after which the envelopes are transported to the insertion device 3. The envelope enters an entrance path 5 of the insertion device 3, and an entry detector 4 detects the envelope. Then, the respective conveyance rollers are driven, thus starting transporting the envelope.

In FIG. 3, a pivotable upper separation pawl 6 is at an upper position to guide the envelope to a lower conveyance path 9, blocking an upper conveyance path 7. Thus, the envelope is transported along the lower conveyance path 9. Additionally, a pivotable lower separation pawl 10 is provided at a bifurcation position from the lower conveyance path 9 between a vertical conveyance path 11 and an enclosure conveyance path 12. To guide the envelope, the lower separation pawl 10 pivots counterclockwise in FIG. 3 to a position to open the vertical conveyance path 11. Thus, the envelope is guided to the vertical conveyance path 11. A pair of chuck rollers 20 and 36, provided extreme downstream in the vertical conveyance path 11, clamps a gusset of the envelope, retaining the envelope there, and waits for the enclosure. At this time, a pair of pivotable rollers 22 is withdrawn from the envelope in the directions indicated by arrows Y1 and Y1', respectively, not to contact the envelope.

In the enclosure supply device 2, enclosures in one of the first inserter cassette 201 and the second inserter cassette 202 are selected and transported to the insertion device 3. The enclosure enters the entrance path 5, and the entry detector 4 detects the enclosure. Then, the respective conveyance rollers are driven, thus starting transporting the enclosure.

In FIG. 3, the upper separation pawl 6 pivots to the upper position, thus guiding the enclosure to the lower conveyance path 9. The lower separation pawl 10 pivots to the position shown in FIG. 3, thus guiding the enclosure to the enclosure conveyance path 12. The enclosure passes by an enclosure detector 13 and is stacked on an intermediate tray 15. Subsequently, a return roller 14 moves to a position in contact with the intermediate tray 15 and transports the enclosure toward a back stopper 18. Further, a pair of side joggers 17 pushes the enclosure in the direction perpendicular to the direction in which the enclosure is transported, thus aligning the enclosure in the width direction. This operation is repeated until a set of enclosures inserted in one envelope is aligned on the intermediate tray 15.

After a bundle of enclosures is stacked on the intermediate tray 15, the back stopper 18 is withdrawn in the direction indicated by arrow Y2. A front stopper 16 starts moving in the direction indicated by an arrow shown in FIG. 3 to a position indicated by broken lines and transports the bundle of enclosures inside a pack unit 19. Then, the bundle of enclosures is clamped in nips between upper rollers 42 and lower rollers 43, arranged vertically (shown in FIG. 11), in the pack unit 19. After the enclosures are transported therein, the pack unit 19 pivots about a support point 46 in the direction indicated by arrow Y3 shown in FIG. 3. Then, a single enclosure or multiple enclosures to be inserted in a single envelope are transported by the upper rollers 42 and the lower rollers 43 of the pack unit 19 into the envelope retained by the pair of chuck rollers 20 and 36. After the enclosures are put in the envelope, the pivotable rollers 22 move in the direction opposite to the directions indicated by arrows Y1 and Y1', respectively, and start transporting the envelope to a discharge path 23. The envelope is transported through the discharge path 23, passes by an envelope detector 24, and is stacked on an envelope tray 26.

It is to be noted that the upper separation pawl 6 is provided at a bifurcation between the upper conveyance path 7 leading to an upper discharge tray 25 and the lower conveyance path 9. When the upper separation pawl 6 pivots clockwise from the position shown in FIG. 3 to a position to open the upper conveyance path 7, the envelope or the enclosure is discharged along the upper conveyance path 7 to the upper discharge tray 25. It is to be noted that, in FIG. 3, reference numeral 8 denotes a discharge detector to detect the object discharged to the upper discharge tray 25.

Figure 4:
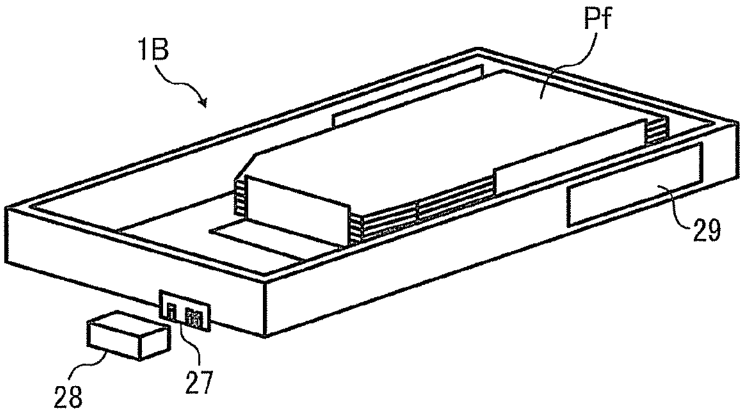
FIG. 4 is a perspective view that illustrates a feed cassette and a size detecting system in an image forming apparatus.

FIG. 4 is a perspective view that illustrates the feed cassette 1B of the image forming apparatus 1 and a size detecting system to detect the size of envelopes or enclosures set in the feed cassette 1B.

In FIG. 4, a planar size indicator 27 is attached to each feed cassette 1B. Each size indicator 27 is sized according to the size of the sheets or envelopes contained therein. The main body of the image foaming apparatus 1 includes a size detector 28 corresponding to each size indicator 27. When the feed cassette 1B is set in the main body, the size detector 28 detects the size indicator 27 and thus recognizes the size of sheets or envelopes (in FIG. 4, envelopes Pf) contained in the feed cassette 1B. Additionally, a size sticker 29 (i.e., a size label) is attached to a side face of the feed cassette 1B so that the user can recognize the size or type of objects contained therein.

Figure 5:
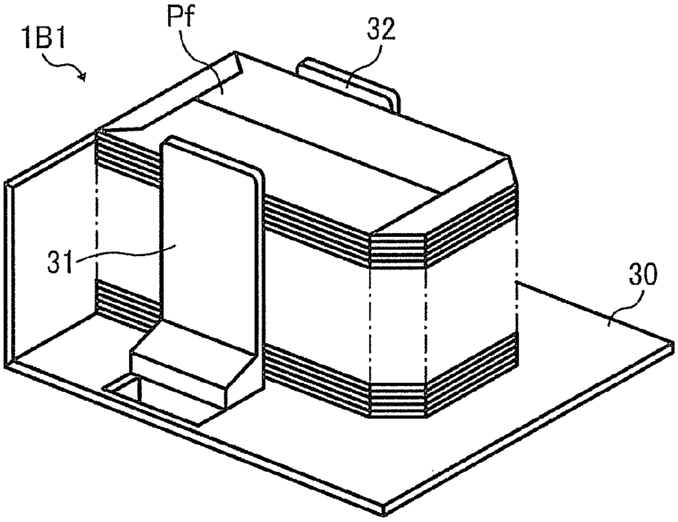
FIG. 5 is a perspective view that illustrates a feed cassette and a size detecting system in an image forming apparatus.
Figure 6:
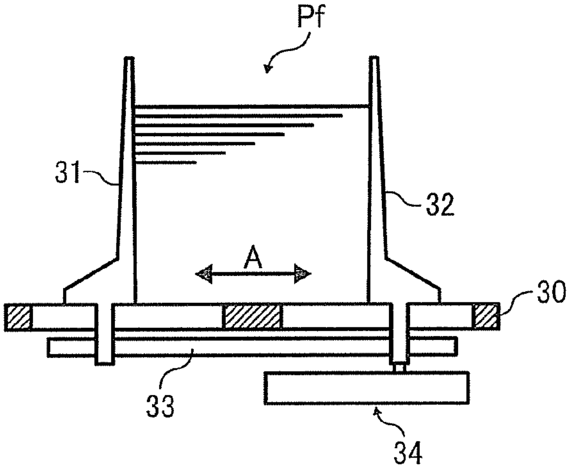
FIG. 6 is a lateral cross-sectional view of the configuration shown in FIG. 5.

FIG. 5 is a perspective view that illustrates a variation of the feed cassette 1B of the image forming apparatus 1 and the size detecting system to detect the size of the envelope or enclosure stored therein. FIG. 6 is a cross-sectional view of the feed cassette and the size detecting system shown in FIG. 5.

A feed cassette 1B1 shown in FIGS. 5 and 6 includes a bottom plate 30 on which the envelopes Pf are stacked and a pair of side guides 31 and 32 slidable in a direction indicated by arrow A shown in FIG. 6, along a guide rod 33. The envelopes Pf are set in a center portion of the bottom plate 30, pushed by the side plates 31 and 32. Additionally, a size detector 34 is provided beneath the bottom plate 30. The size detector 34 detects the position of the side guide 32 to detect the size of the objects (in FIGS. 5 and 6, envelopes Pf) stacked on the bottom plate 30. More specifically, the size detector 34 compares the detected position of the side guide 32 with size data stored preliminarily therein and thus recognizes the size of the sheets or the envelopes Pf set on the bottom plate 30. For example, a variable-resistance position detector can be used as the size detector 34. The CPU 1U can easily detect the size of the objects contained in the sheet cassette 1B1 based on the resistance value output by the variable-resistance type position detector or changes in the resistance.

Figure 7:
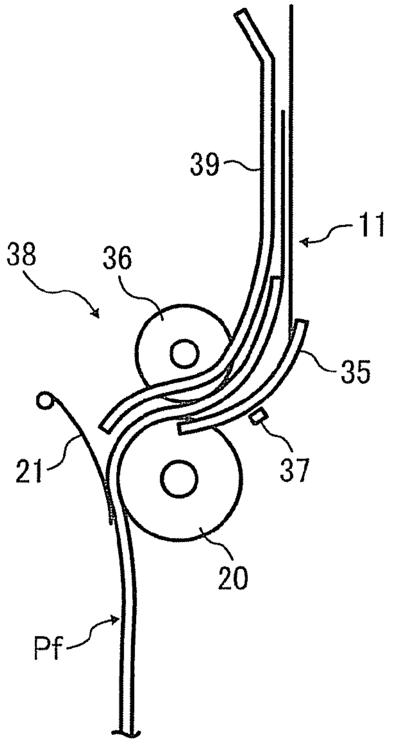
FIG. 7 is a cross-sectional view that illustrates a main portion of an envelope chuck unit in the insertion device.

FIG. 7 is a cross-sectional view that illustrates a main portion of an envelope chuck unit in the insertion device 3.

In FIG. 7, the lower chuck roller 20 and the upper chuck roller 36, provided extreme downstream in the vertical conveyance path 11, together form an envelope chuck unit 38. The chuck rollers 20 and 36 are arranged substantially vertically in FIG. 7 and can rotate while pressing against each other, forming a nip portion therebetween. The chuck rollers 20 and 36 may be rollers, cones, or spheres. Envelope guides 35 and 39 to guide the envelope Pf to the nip portion between the chuck rollers 20 and 36 are provided upstream from the chuck rollers 20 and 36 in the vertical conveyance path 11 in the direction in which the envelope is transported (hereinafter "envelope conveyance direction"). An envelope detector 37 is provided on an upstream side of the nip portion in the envelope conveyance direction. The unsealing sheet 21 in contact with the lower chuck roller 20 is formed of a plastic sheet such as Mylar® and can deform elastically. The unsealing sheet 21 is provided at such a position that a part of the unsealing sheet 21 can enter an opening Pon (shown in FIG. 8) of the envelope Pf supported by the chuck rollers 20 and 36, thereby unsealing the envelope Pf.

The envelope guides 35 and 39 guide the envelope Pf from the vertical conveyance path 11 to the nip portion between the chuck rollers 20 and 36 and further downward from the nip portion between the chuck rollers 20 and 36 along a circumferential surface of the lower chuck roller 20.

The unsealing sheet 21 may be a thin resin film member and positioned adjacent to the lower chuck roller 20. An upper side of the unsealing sheet 21 is fixed, and, in an ordinary state, a portion of the unsealing sheet 21 adjacent to a lower end portion 21*a* (shown in FIG. 8) thereof is pressed against the lower chuck roller 20 with a predetermined pressure due to the elasticity of the material of the unsealing sheet 21.

Figure 8:
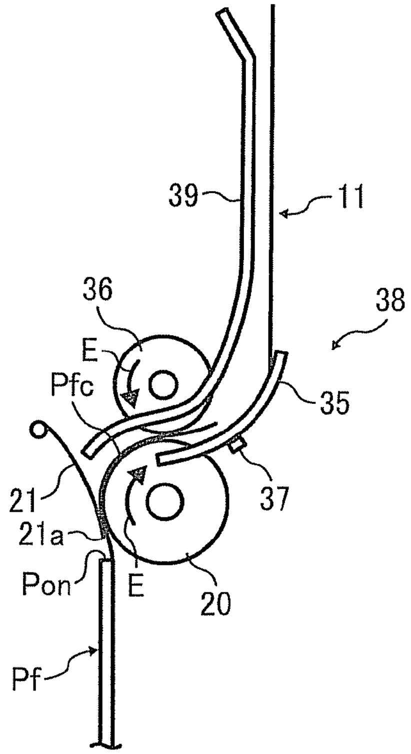
FIG. 8 is a cross-sectional view that illustrates the main portion of the envelope chuck unit, in which an opening of the envelope is positioned beneath a lower end of an unsealing sheet.
Figure 9:
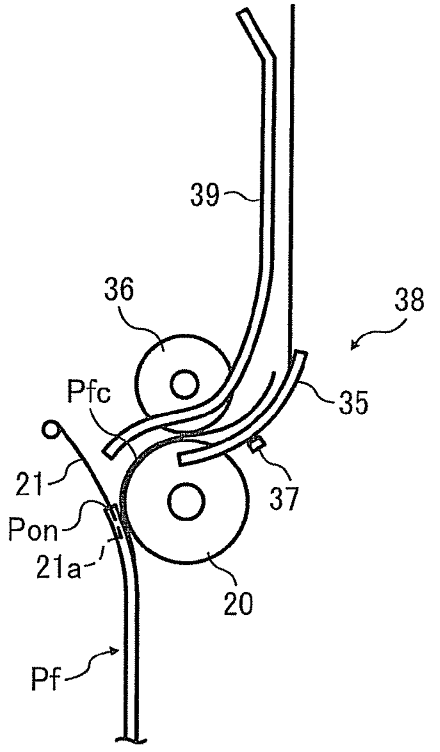
FIG. 9 is a cross-sectional view that illustrates the main portion of the envelope chuck unit, in which the lower end of the unsealing sheet is in the envelope.

FIG. 8 is a cross-sectional view of the main portion of the envelope chuck unit 38 and illustrates a state in which the opening Pon of the envelope Pf is positioned beneath the lower end portion 21*a* of the unsealing sheet 21. FIG. 9 is another cross-sectional view of the main portion of the envelope chuck unit 38, and the lower end portion 21*a* of the unsealing sheet 21 is in the envelope Pf in FIG. 9.

In the envelope chuck unit 38, the envelope guides 35 and 39 guide the envelope Pf to the nip portion between the chuck rollers 20 and 36 when the envelope Pf is transported downward in FIG. 8. Subsequently, the chuck rollers 20 and 36 rotate and transport the envelope Pf between the chuck roller 20 and the unsealing sheet 21. When the sheet or enclosure is guided into the envelope Pf, the envelope Pf is stopped at such a position that a flap Pfc of the envelope Pf is clamped by the chuck rollers 20 and 36 as shown in FIG. 8. More specifically, when the envelope detector 37 detects passage of an end of the flap Pfc of the envelope Pf, the CPU 3U stops a driving motor that drives the chuck rollers 20 and 36, thus stopping the envelope Pf. At that time, the opening Pon of the envelope Pf is positioned lower than the lower end portion 21*a* of the unsealing sheet 21.

Figure 10:
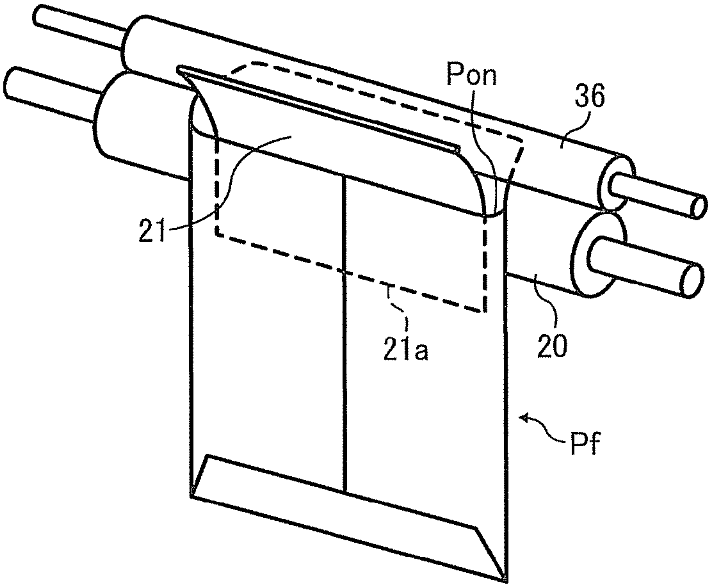
FIG. 10 is a perspective view that illustrates a state in which reverse rotation of chuck rollers is stopped, thereby stopping the envelope.

Subsequently, the CPU 3U rotates the chuck rollers 20 and 36 in reverse, which is the direction indicated by arrow E shown in FIG. 8. Thus, the envelope Pf is switchbacked and transported upward in the vertical conveyance path 11. At that time, because the lower side of the unsealing sheet 21 is in contact with the flap Pfc of the envelope Pf due to its elasticity, the lower end portion 21*a* of it enters the opening Pon of the envelope Pf as shown in FIG. 9. The reverse rotation of the chuck rollers 20 and 36 is stopped in this state, and upward conveyance of the envelope Pf is stopped, as shown in FIG. 10. In the state shown in FIG. 10, the envelope Pf is opened by the lower end portion 21*a* of the unsealing sheet 21 that is in the opening Pon of the envelope Pf.

Figure 11:
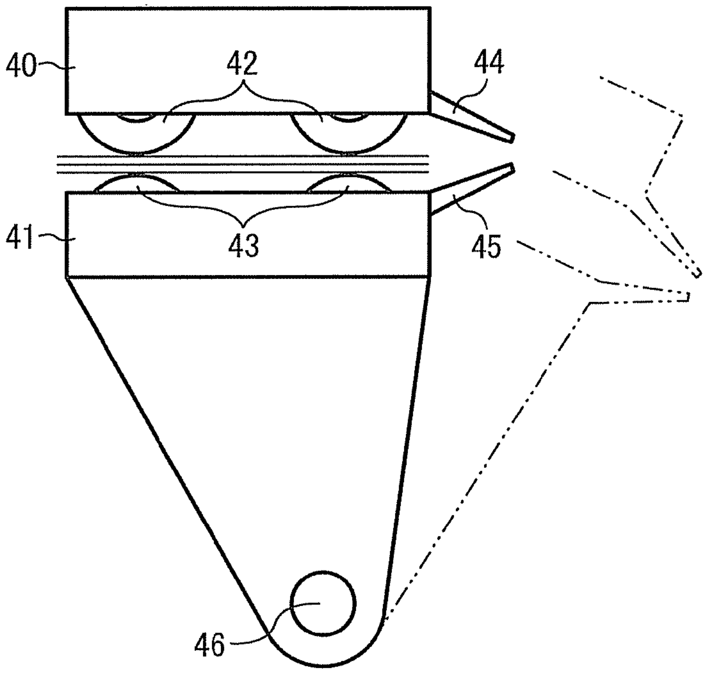
FIG. 11 is a front view of a pack unit of the insertion device.

FIG. 11 is a front view illustrating a configuration of the pack unit 19 of the insertion device 3.

In the configuration shown in FIG. 11, the pack unit 19 includes an upper pack portion 40 and a lower pack portion 41, and the upper rollers 42 and the lower rollers 43 are rotatively attached to the upper pack portion 40 and a lower pack portion 41, respectively. Additionally, entry guides 44 and 45 are respectively provided on the right end sides of the upper pack portion 40 and the lower pack portion 41 in FIG. 11. Base ends (proximal ends) of the entry guides 44 and 45 are rotatively supported by the upper pack portion 40 and the lower pack portion 41, respectively, and distal end sides of the entry guides 44 and 45 are biased toward each other by springs with a relatively small pressure, respectively. With this configuration, when a bundle of enclosures passes between the entry guides 44 and 45, the entry guides 44 and 45 are pushed away from each other. Thus, the resistance that the bundle of enclosures receives when the bundle is transported can be lower.

The pack unit 19 pivots about the support point 46 supporting the pack unit 19, and the entry guides 44 and 45 are inserted between the flap Pfc and the unsealing sheet 21, which is on standby at the position shown in FIG. 10. In this state, the front stopper 16 moves in the direction indicated by the arrow shown in FIG. 3 as described above, and the upper and lower rollers 42 and 43 are driven. Then, the enclosure passes between the entry guides 44 and 45 and is inserted in the envelope Pf.

Figure 12:
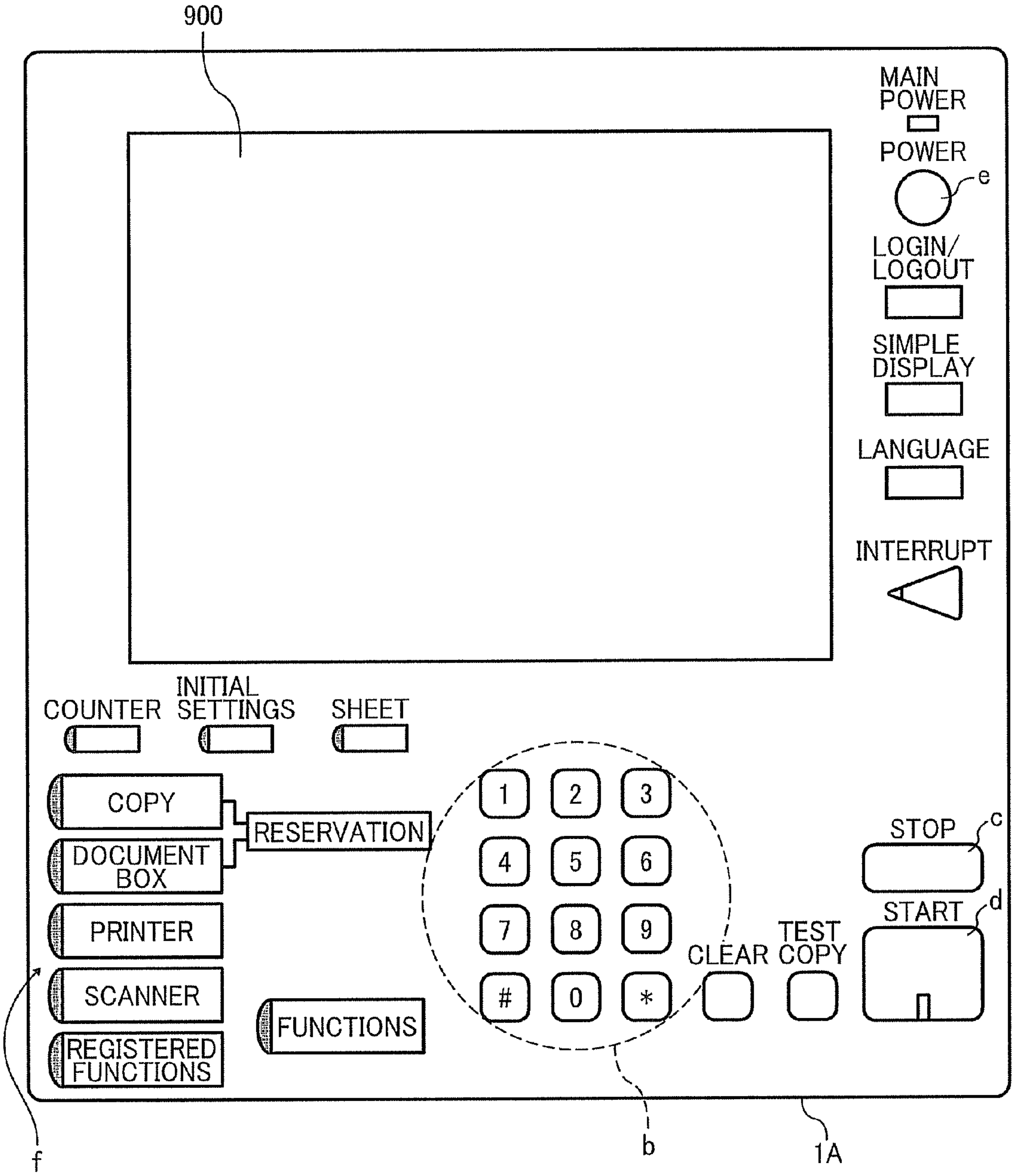
FIG. 12 is a front view of the control panel provided on an upper face of the image forming apparatus.

FIG. 12 is a front view of the control panel 1 A provided on an upper face of the image forming apparatus 1.

Referring to FIG. 12, the control panel 1A includes the display 900, a group of numeric keys b, a STOP key c, a START key d, a POWER button e, and a group of function selection keys f. The display 900 displays various messages and input keys in layers. The user can input numbers by pressing the numeric keys b. The user can stop the processing by pressing the STOP key c. Pressing the START key d generates a trigger signal to start image formation. The user can turn on and off the image forming system by pressing the POWER button e. The group of function selection keys f includes keys with which the user selects copying, printing, scanning, or the like.

Figure 13:
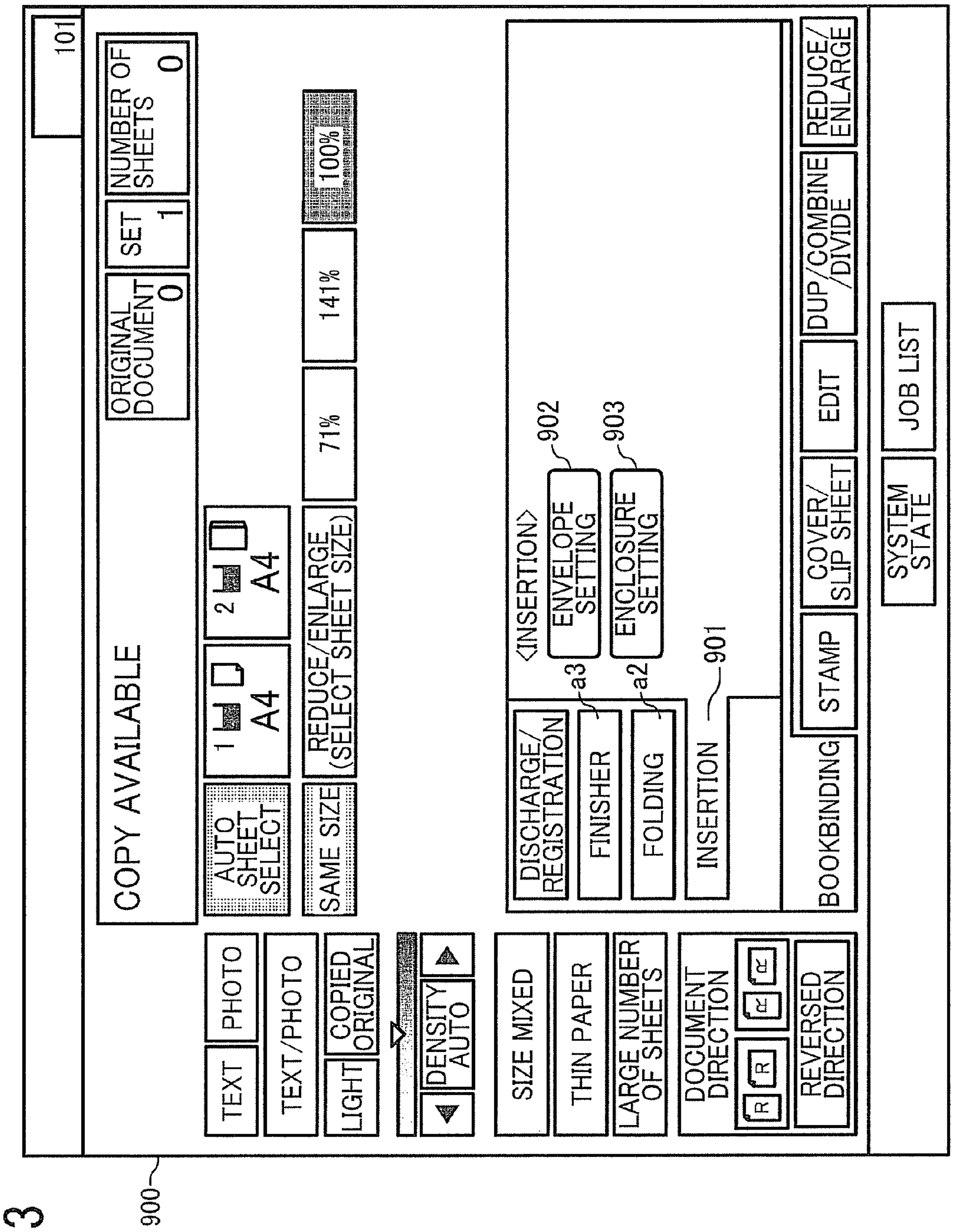
FIG. 13 illustrates indications on the control panel.

FIG. 13 illustrates indications on the display 900 of the control panel 1A shown in FIG. 12.

The indications shown in FIG. 13 appear when A4 size sheets are stored laterally in the first feed cassette 1B (hereinafter "A4Y sheets"), and envelopes that accommodate A4Y sheets are stored in the second feed cassette 1B.

To perform insertion of enclosures into envelopes, the user presses an INSERTION button 901 of an insertion tab on the display 900 shown in FIG. 13. The insertion tab includes an ENVELOPE SETTING button 902 and an ENCLOSURE SETTING button 903 for setting images formed on envelopes, enclosures inserted in the envelope, and inputting data regarding enclosures set in the enclosure supply device 2.

A procedure of insertion setting is described below using a case shown in FIG. 13.

Figure 14:
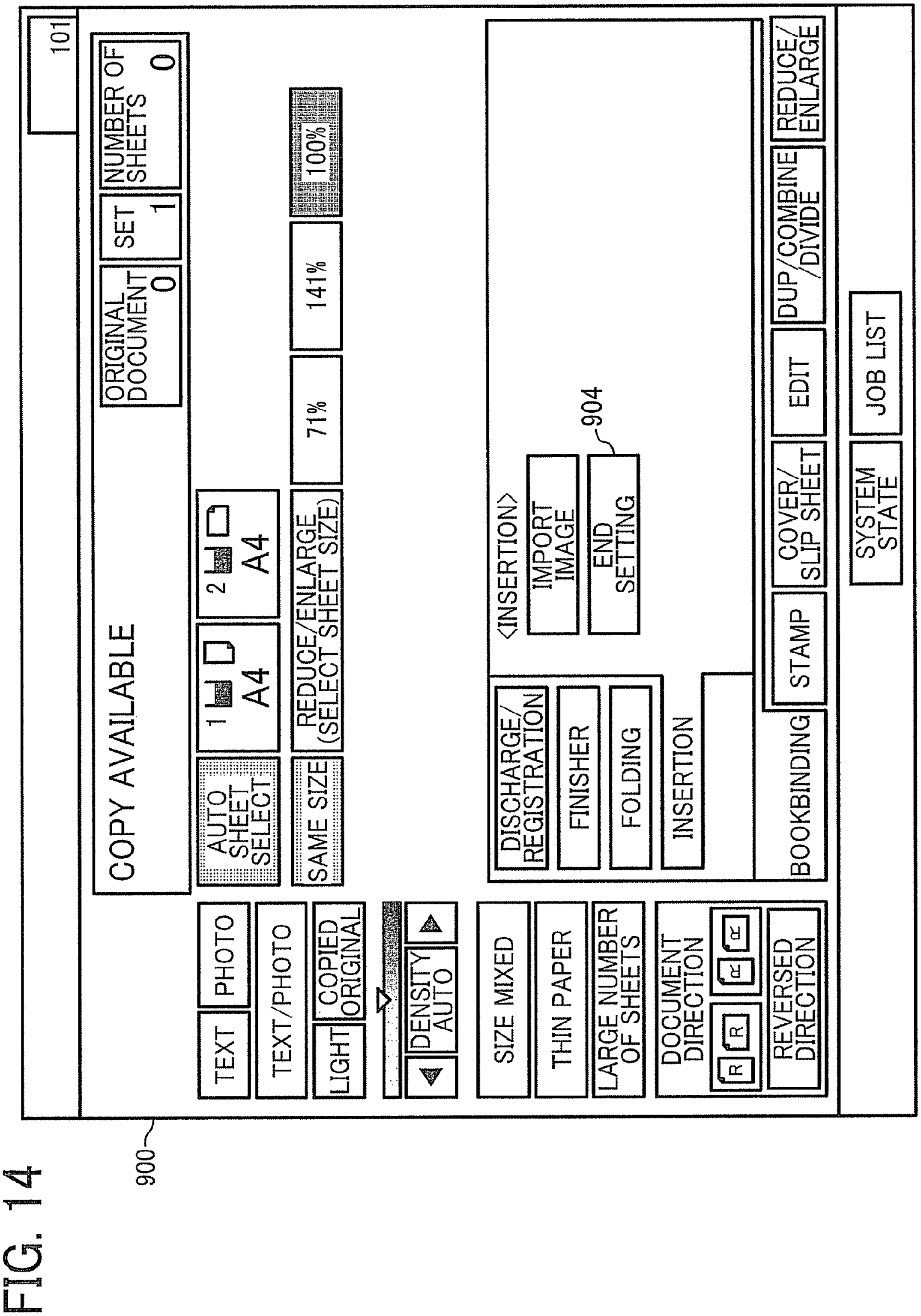
FIG. 14 illustrates a screen display on the control panel for envelope setting.

FIG. 14 illustrates indications for envelope settings on the display 900 of the control panel 1A. When the ENVELOPE SETTING button 902 is pressed on the display 900 shown in FIG. 13, a setting screen on the lower layer appears as shown in FIG. 14. On the setting screen shown in FIG. 14, the followings settings regarding insertion can be made. It is to be noted that setting of only typical items are described below although other items (e.g., image density, magnification, and the like) can be also set similarly to typical image forming apparatuses.

(1) Envelope Selection

The sheet to be used is selected among those contained in the respective feed cassettes 1B. It is to be noted that, in envelope setting, only the envelope Pf is selectable.

(2) Setting of Image Formation and Combination of Envelope Pf and the Enclosure

Images (e.g., addresses) can be printed on the envelope Pf. How to input addresses is described later with reference to FIG. 15. It is to be noted that, in the present embodiment, although settings regarding envelopes is made via the control panel 1A of the image forming apparatus 1, alternatively, those settings may be made from external devices such as computers connected to a network such as a local area network (LAN).

(3) Completion of Settings

After necessary settings are made, the user can finish the setting regarding image formation on the envelope Pf by pressing an END SETTING button 904 on the insertion tab.

Figure 15:
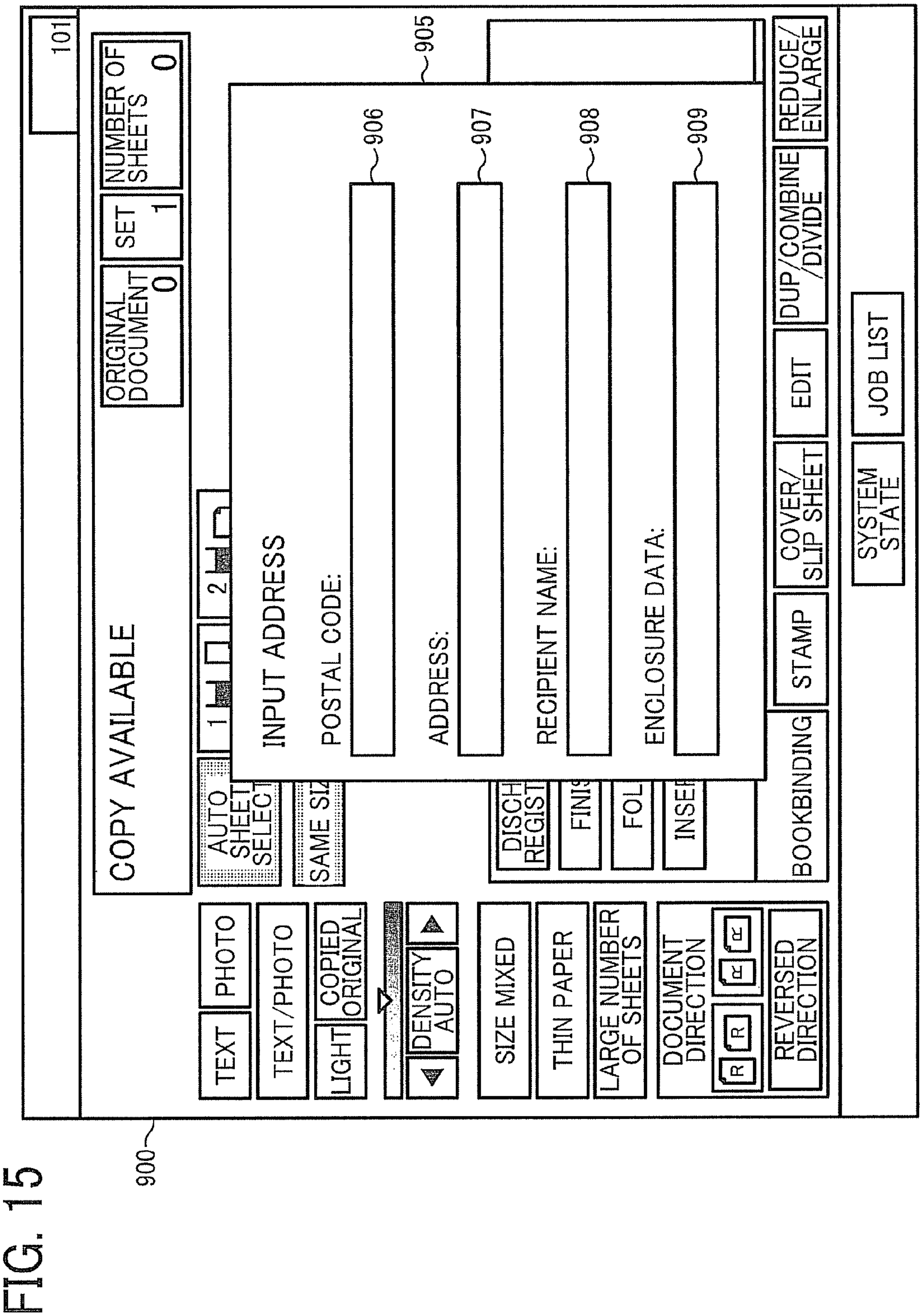
FIG. 15 illustrates an address input window, which appears when an envelope setting button is pressed on the control panel.

FIG. 15 illustrates an address input window 905 that appears on the control panel 1A when the ENVELOPE SETTING button 902 shown in FIG. 13 is pressed to select image setting on the lower layer.

The user can input, for example, postal codes, addresses, and recipient names as data printed on envelopes. The address input window 905 includes a postal code field 906, an address field 907, a recipient name field 908, and an enclosure data field 909. When the user touches, for example, the postal code field 906, numeric keys appear, and the user can input postal codes in the postal code field 906 using the numeric keys. Similarly, when the user touches the address field 907, numeric keys and character keys, such as kana keys (Japanese character keys) or alphabet keys, appear, and the user can input addresses in the address field 907 using those character input keys. Data can be input in a similar way in the recipient name field 908 and the enclosure data field 909. In the enclosure data field 909, identification (classification) or name of the enclosure to be inserted into the envelope can be input. When data input is made, the apparatus asks whether to register the input data. When the user instructs to register the input data, data to be printed relating to the envelope setting is stored in the order of input in a memory unit of the image forming apparatus 1. It is to be noted that the data to be printed may include postal codes, addresses, and names of senders as well as notes. The address input window 905 serves as a first input unit.

The data relating to the envelope setting stored in the memory unit of the image forming apparatus 1 is described below with reference to Table 1 shown below. The memory unit stores the input data in the order of input.

TABLE 1

| No. | Output order | Postal code | Address | Recipient name | Feed cassette | Enclosure data |
|---|---|---|---|---|---|---|
| 1 | 1 | xxx-xxxx | Tokyo | A | Cassette 2 | A |
| 2 | 2 | yyy-yyyy | Kanagawa | B | Cassette 2 | B |
| 3 | 3 | Zzz-zzzz | Ibaraki | C | Cassette 2 | C |
| 4 | 4 | xxx-xxxx | Tokyo | D | Cassette 2 | A |
| 5 | 5 | yyy-yyyy | Kanagawa | E | Cassette 2 | B |
| 6 | 6 | Zzz-zzzz | Ibaraki | F | Cassette 2 | C |

The following items are stored in Table 1. The order of input is recorded in the "No." field, and the order of output (i.e., printing order) is recorded in the "output order" field. Additionally, the postal code is recorded in the "postal code" field, and the address is recorded in the "address" field. Further, the recipient name is recorded in the "recipient name" field, and the identification data of the feed cassette is recorded in the "feed cassette" field. The identification data of the enclosure is recorded in the "enclosure data" field.

Figure 16:
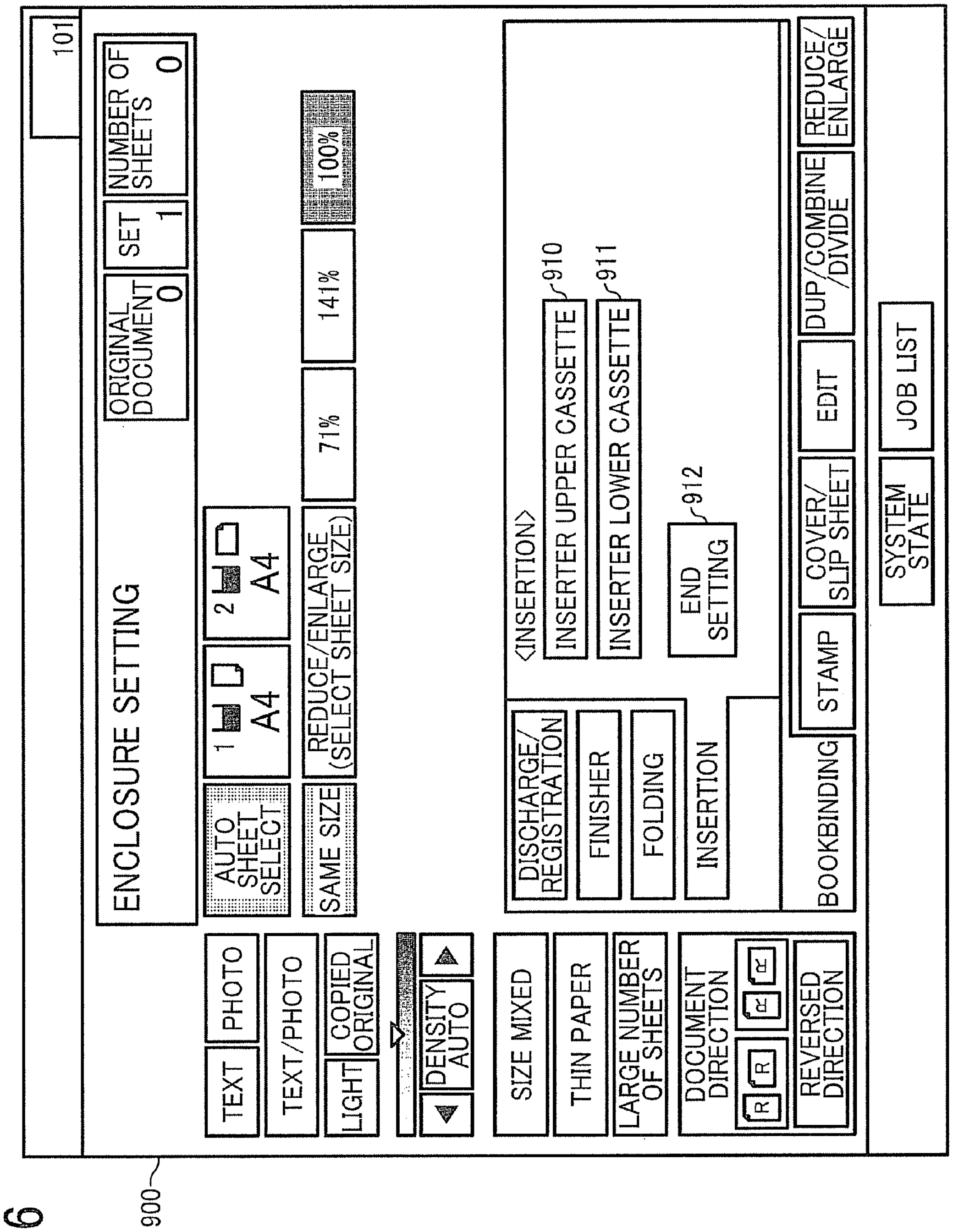
FIG. 16 illustrates an enclosure setting window, which appears when an enclosure setting button is pressed on the control panel.

When the ENCLOSURE SETTING button 903 in FIG. 13 is pressed, an enclosure setting window shown in FIG. 16 appears on the control panel 1A. In the enclosure setting window, settings relating to enclosures set in the inserter upper cassette 201 and the inserter lower cassettes 202 of the enclosure supply device 2 can be made.

(1) Inserter Upper Cassette

The user can input the identification or classification (type) of enclosures set in the inserter upper cassette 201 by pressing an INSERTER UPPER CASSETTE button 910 in the insertion tab.

(2) Inserter Lower Cassette

The user can input the identification or classification of enclosures set in the inserter lower cassette 202 by pressing an INSERTER LOWER CASSETTE button 911.

(3) Completion of Settings

After necessary settings are made, the user can finish the setting regarding enclosures by pressing an END SETTING button 912 on the insertion tab.

Figure 17:
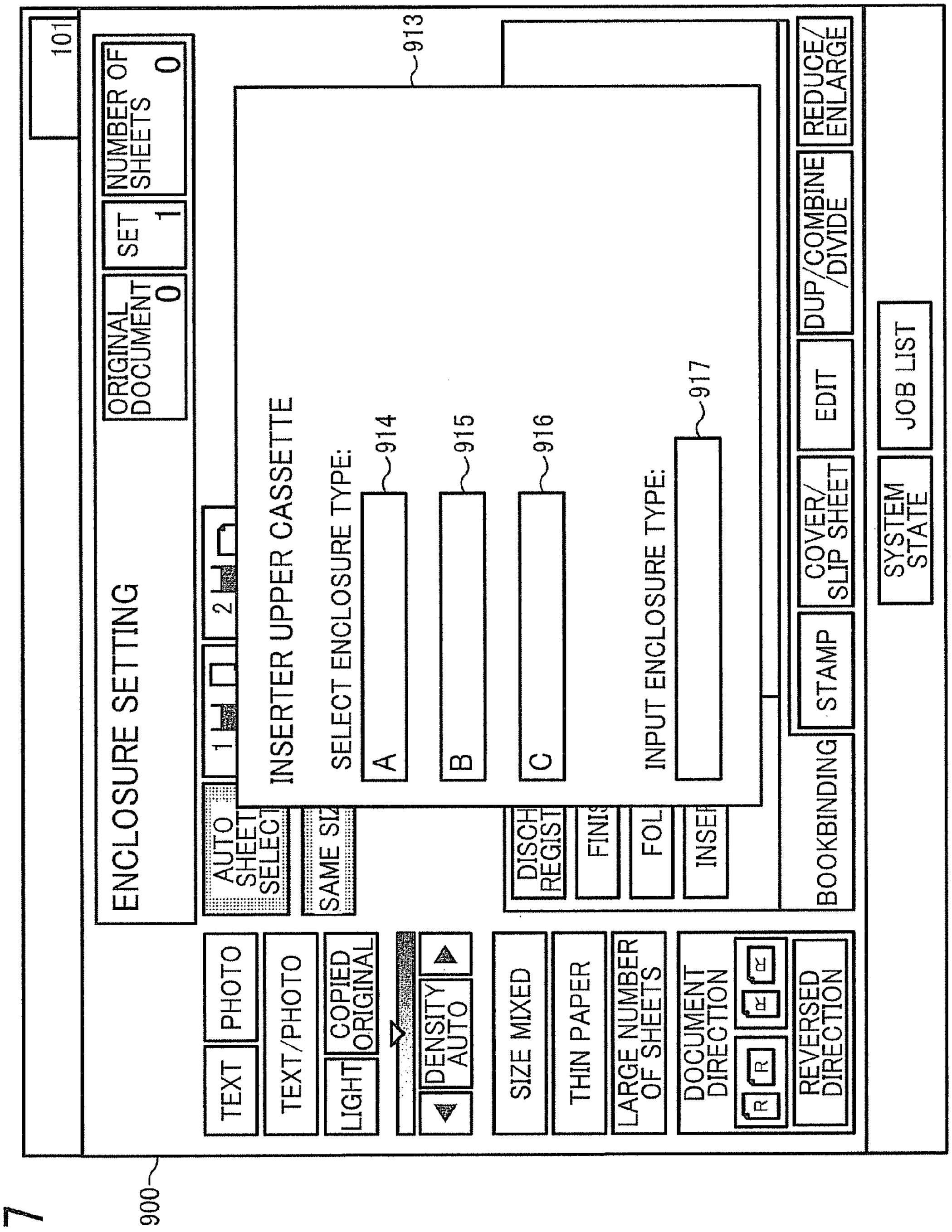
FIG. 17 illustrates a setting window for setting enclosure stored in an inserter upper cassette, which appears when an inserter upper cassette button is pressed on the enclosure setting window.

When the INSERTER UPPER CASSETTE button 910 in FIG. 16 is pressed, a setting window 913 for the inserter upper cassette 201 shown in FIG. 17 appears on the control panel 1A.

The setting window 913 displays a menu of identification data (e.g., identification codes) of enclosures set in the inserter cassette, input in envelope setting, so that the user can select one of them on the menu. When, for example, "A", "B", and "C" are input as enclosure data in envelope setting, fields 914, 915, and 916 respectively indicating "A", "B", and "C" are selectable. Additionally, the user can input new enclosure data in an input field 917. Multiple types of enclosures can be selected in enclosure setting. When the INSERTER LOWER CASSETTE button 911 in FIG. 16 is pressed, similar settings can be made. The setting window 913 for the inserter upper cassette 201 and a setting window for the inserter lower cassette 202 serve as a second input unit.

Figure 18:
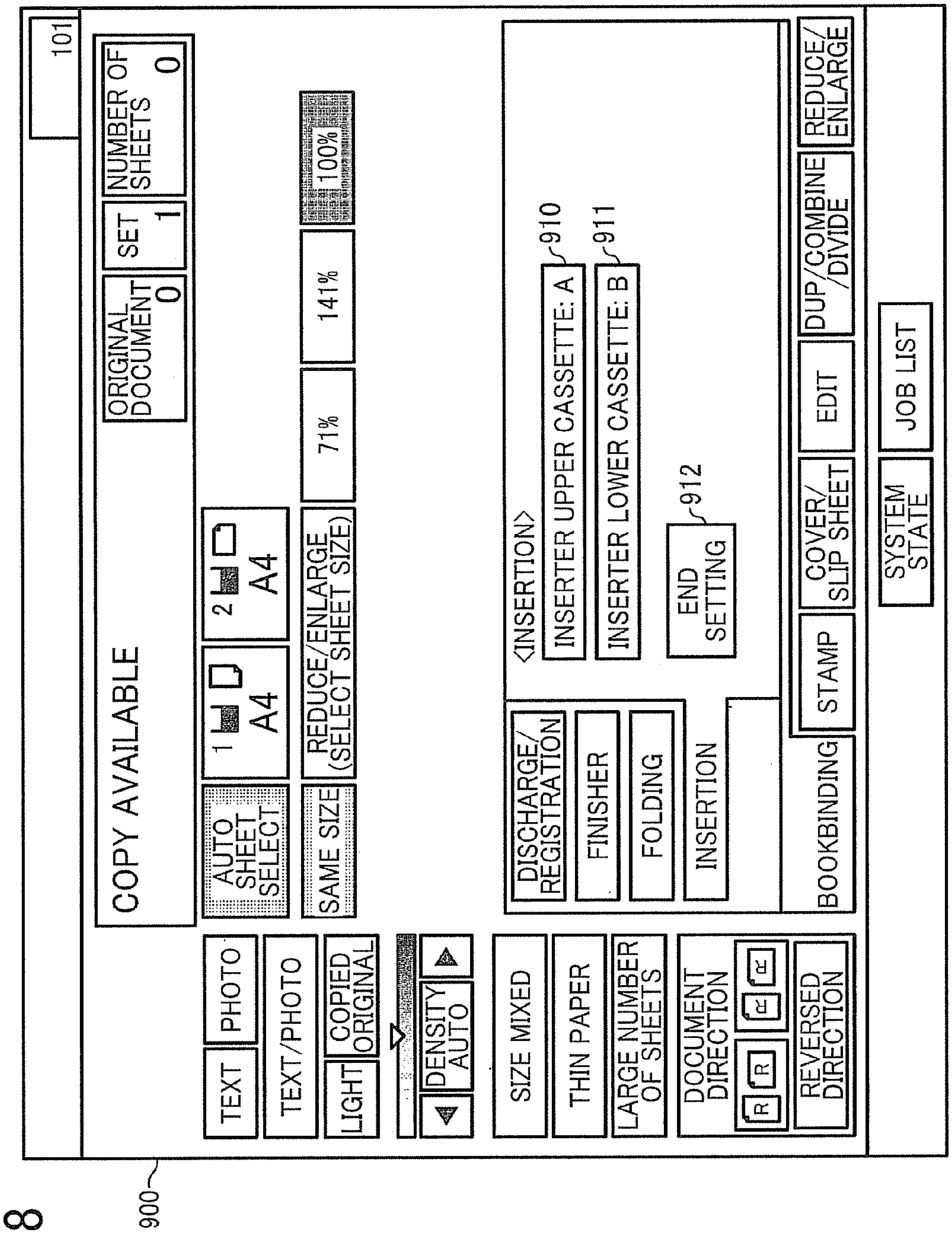
FIG. 18 is an example of a screen display that appears after enclosure data is selected for the inserter upper cassette and an inserter lower cassette in enclosure setting.

FIG. 18 is an example of a screen display after enclosure data is selected for the inserter upper cassette 201 and the inserter lower cassette 202 in enclosure setting. In the screen display shown in FIG. 18, stored enclosure identification codes "A" and "B" are selected in the INSERTER UPPER CASSETTE button 910 and the INSERTER LOWER CASSETTE button 911, respectively. When the user presses the END SETTING button 912, those settings are registered.

Figure 19:
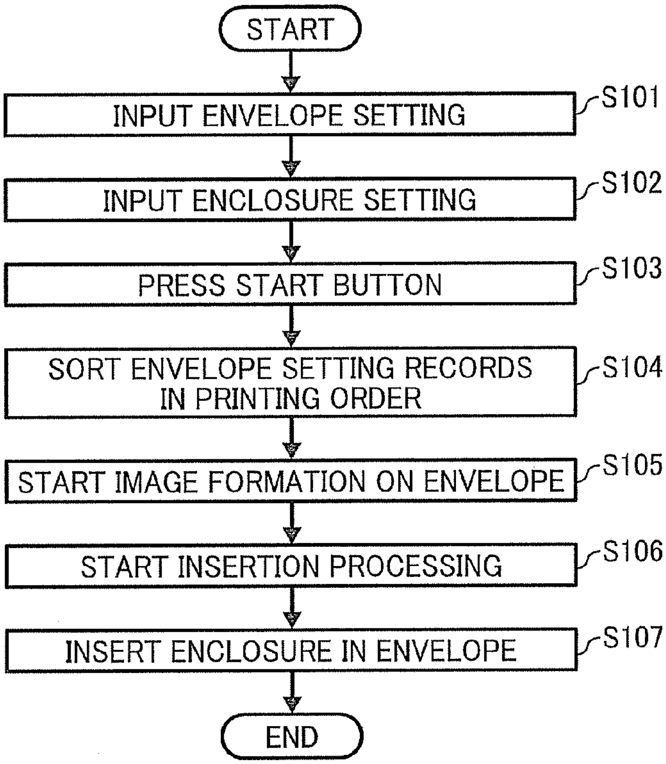
FIG. 19 is a flowchart illustrating a procedure of printing image data on envelopes and inserting enclosures in the envelopes (hereinafter "printing and insertion")

FIG. 19 is a flowchart illustrating a procedure of printing image data on envelopes and inserting enclosures in the envelopes (hereinafter "printing and insertion processing").

In printing and insertion processing, the user performs envelope setting at S101 and enclosure setting at S102. It is to be noted that the order of envelope setting and enclosure setting is not limited. After those settings are completed, at S103 the user presses the START key d on the control panel 1A to start printing and insertion processing.

At S104, the insertion setting records to be output are sorted in the printing order. The output order is changed later if enclosures other than those set in the inserter upper cassette 201 and the inserter lower cassettes 202 are inserted into envelopes. Sorting of data in the order of printing is described in further detail later.

When sorting of data in the order of printing is finished, the envelopes Pf are fed from the feed cassette 1B selected in envelope setting. At S105, the data decided in envelope setting is formed on the envelope Pf, after which the envelope Pf is transported to the pair of chuck rollers 20 and 36 of the insertion device 3.

Meanwhile, at S106, the enclosures are fed from the selected inserter upper cassette 201 or the inserter lower cassette 202 of the enclosure supply device 2 to the intermediate tray 15 of the insertion device 3. When multiple sheets are inserted into a single envelope Pf, the above-described operation is repeated for the number of sheets inserted. After all sheets inserted into a single envelope Pf are transported to the intermediate tray 15, at S107 insertion of enclosures is started. The envelope Pf into which the enclosure is inserted is discharged to the envelope tray 26.

Figure 20:
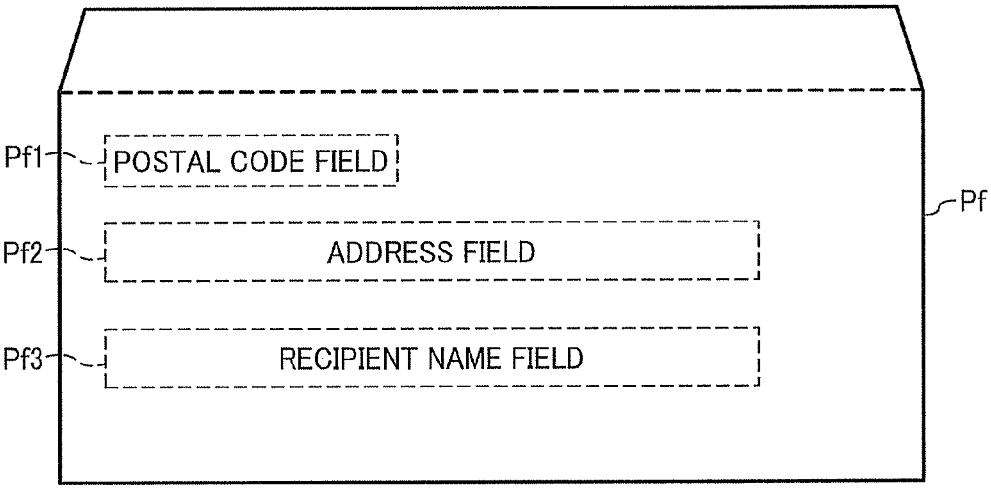
FIG. 20 illustrates a recipient data print area on envelopes.

FIG. 20 illustrates a recipient data print area in the envelope Pf. The recipient data including postal code, address, and recipient name is formed as an image on the envelope Pf. In the example shown in FIG. 20, the recipient data print area includes print fields, namely, a postal code field Pf1, an address field Pf2, and a recipient name field Pf3. When the image data is set in the envelope setting, the data input is printed in the respective print fields Pf1, Pf2, and Pf3. Accordingly, at least "postal code", "address", and "recipient name" should be input in image setting.

Figure 21:
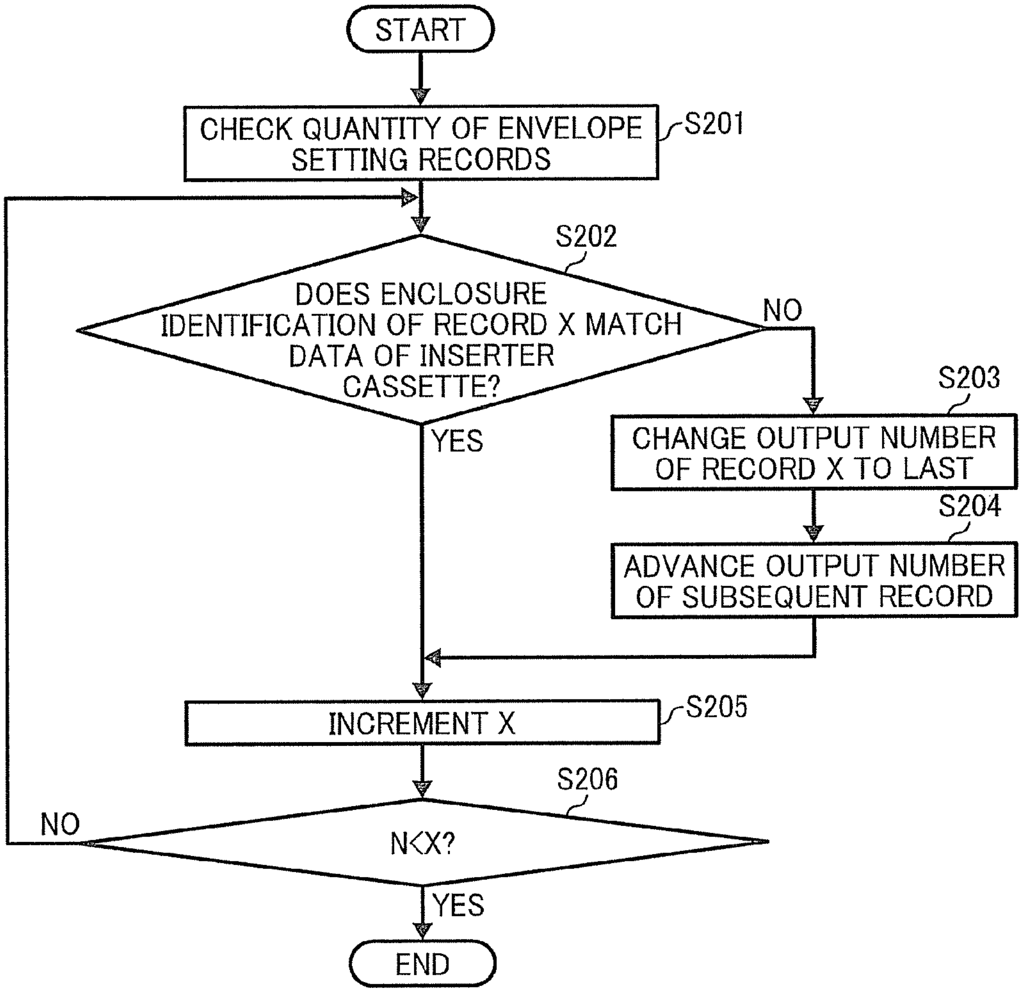
FIG. 21 is a flowchart illustrating a procedure of sorting of data in printing order.

FIG. 21 is a flowchart illustrating a procedure of sorting of data in the order of printing shown in FIG. 19.

Referring to FIG. 21, at S201 the CPU 1U checks the number (quantity) of records regarding which envelope setting is made (hereinafter "number of insertion setting records") and stores the number. In the procedure shown in FIG. 21, the number of insertion setting records is "N". At S202, the CPU 1U checks whether the enclosure identification data relating to the input data No. X matches the identification data of enclosures set in the inserter cassette 201 or 202. The initial value of "X" is "1", and the CPU 1U initially checks whether the enclosure identification data in the insertion setting record No. 1 matches the identification data of enclosures set in the enclosure supply device 2.

When the enclosure identification data matches the identification data of enclosures set in the enclosure supply device 2 (Yes at S202), the output order is not changed. By contrast, when the enclosure identification data of the insertion setting record does not match the identification data of enclosures stored in the enclosure supply device 2 (No at S202), at S203 the output number of the input data No. X is changed to the last (output number=N). At S204, the output numbers of input numbers subsequent to No. X are advanced.

Subsequent to the step S204 or when the enclosure identification data of the insertion setting record matches the identification data of enclosures stored in the enclosure supply device 2 (Yes at S202), at S206 the CPU 1U increments the value of "X". At S206, the CPU 1U compares the number of envelopes setting records "N" with the value of "X", that is, whether "N" is smaller than "X" (N<X), and checks whether all insertion setting records are sorted in the printing order. If the value of "X" is smaller than "N", the CPU 1U determines that sorting in the printing order is not completed (No at S206) and checks the subsequent insertion setting record. If "X" is greater than "N", the CPU 1U determines that sorting in the printing order is completed (Yes at S206), and thus the procedure of sorting is completed.

Table 2 shows the results when the insertion setting records shown in Table 1 are sorted in output order according to the procedure shown in FIG. 21.

TABLE 2

| No. | Output order | Postal code | Address | Recipient name | Feed cassette | Enclosure data |
|---|---|---|---|---|---|---|
| 1 | 1 | xxx-xxxx | Tokyo | A | Cassette 2 | A |
| 2 | 2 | yyy-yyyy | Kanagawa | B | Cassette 2 | B |
| 4 | 4 | xxx-xxxx | Tokyo | D | Cassette 2 | A |
| 5 | 5 | yyy-yyyy | Kanagawa | E | Cassette 2 | B |
| 3 | 3 | Zzz-zzzz | Ibaraki | C | Cassette 2 | C |
| 6 | 6 | Zzz-zzzz | Ibaraki | F | Cassette 2 | C |

Table 2 shows the sorting result when the enclosures whose identification code is "A" is set in the inserter upper cassette 201, and the enclosures whose identification code is "B" is set in the inserter lower cassette 202. Because identification codes "A" and "B" are respectively designated regarding enclosures set in the inserter upper cassette 201 and the inserter lower cassette 202, the output numbers of the insertion setting records Nos. 3 and 6, in which the enclosure identification code is "C", are changed to later numbers.

Figure 22:
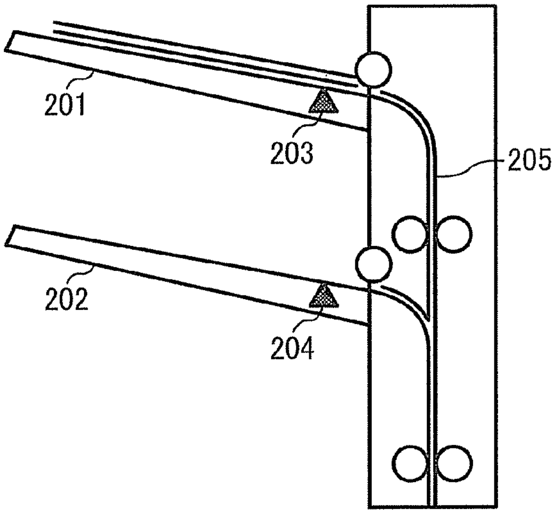
FIG. 22 is an enlarged cross-sectional view that illustrates positions of residual quantity detectors in the feed cassettes of the enclosure supply device.

FIG. 22 is an enlarged cross-sectional view that illustrates positions of residual quantity detectors in the feed cassettes of the enclosure supply device 2.

Referring to FIG. 22, residual quantity detectors 203 and 204 are respectively provided on the trays in the inserter upper cassette 201 and the inserter lower cassettes 202. When enclosures remain on the tray, the residual quantity detector is ON and indicates that there are remaining enclosures. In FIG. 22, the residual quantity detector 203 is ON. By contrast, when no enclosure remains on the tray, the residual quantity detector is OFF and indicates that no enclosure remains. In FIG. 22, the residual quantity detector 204 is OFF.

Figure 23:
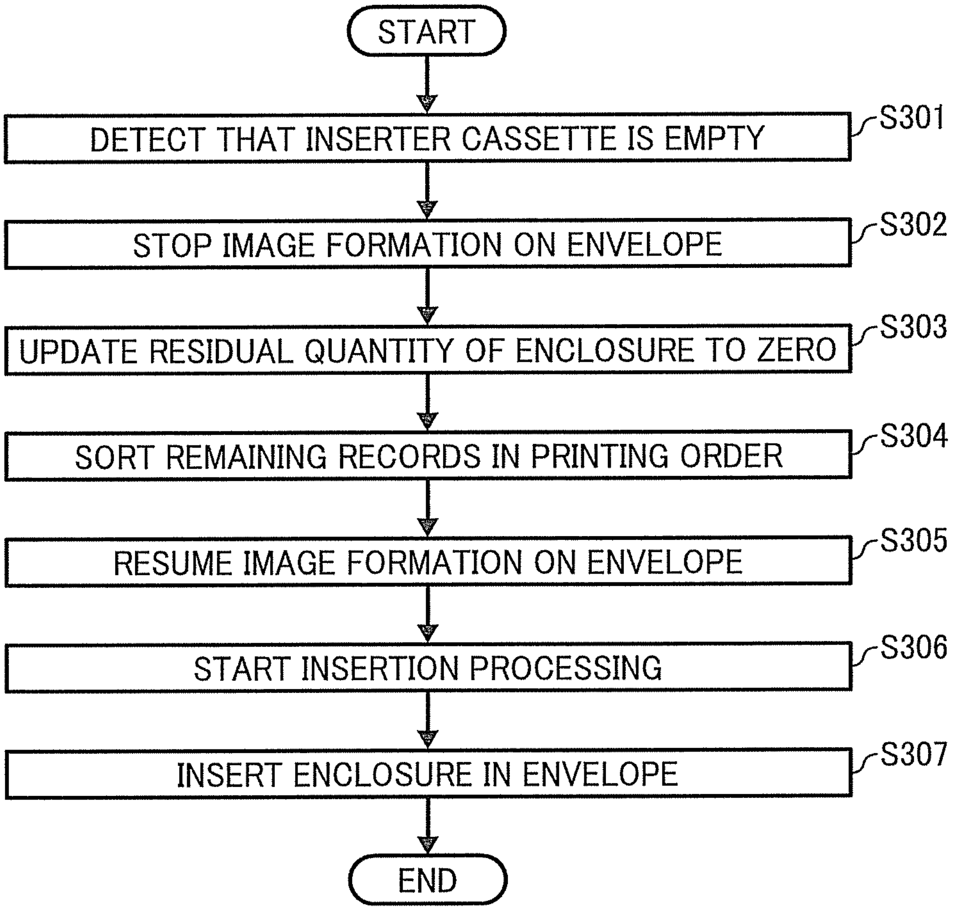
FIG. 23 is a flowchart illustrating a procedure when the inserter cassette becomes empty during printing and insertion.

FIG. 23 is a flowchart illustrating a procedure when the inserter cassette 201 or 202 becomes empty during printing and insertion jobs.

When the inserter cassette 201 or 202 becomes empty, at S301 the residual quantity detector 203 or 204 detects it, and at S302 stops image formation on the envelope. At S303, the CPU 1U updates data of enclosures that are not left in the inserter cassette 201 or 202 (residual quantity=0) and at S304 sorts the remaining records (unfinished records) in the printing order. After sorting is completed, at S305 image formation on the envelope is resumed. At S306, insertion processing in envelopes is started, and at S307 enclosures are inserted into envelopes.

Figure 24:
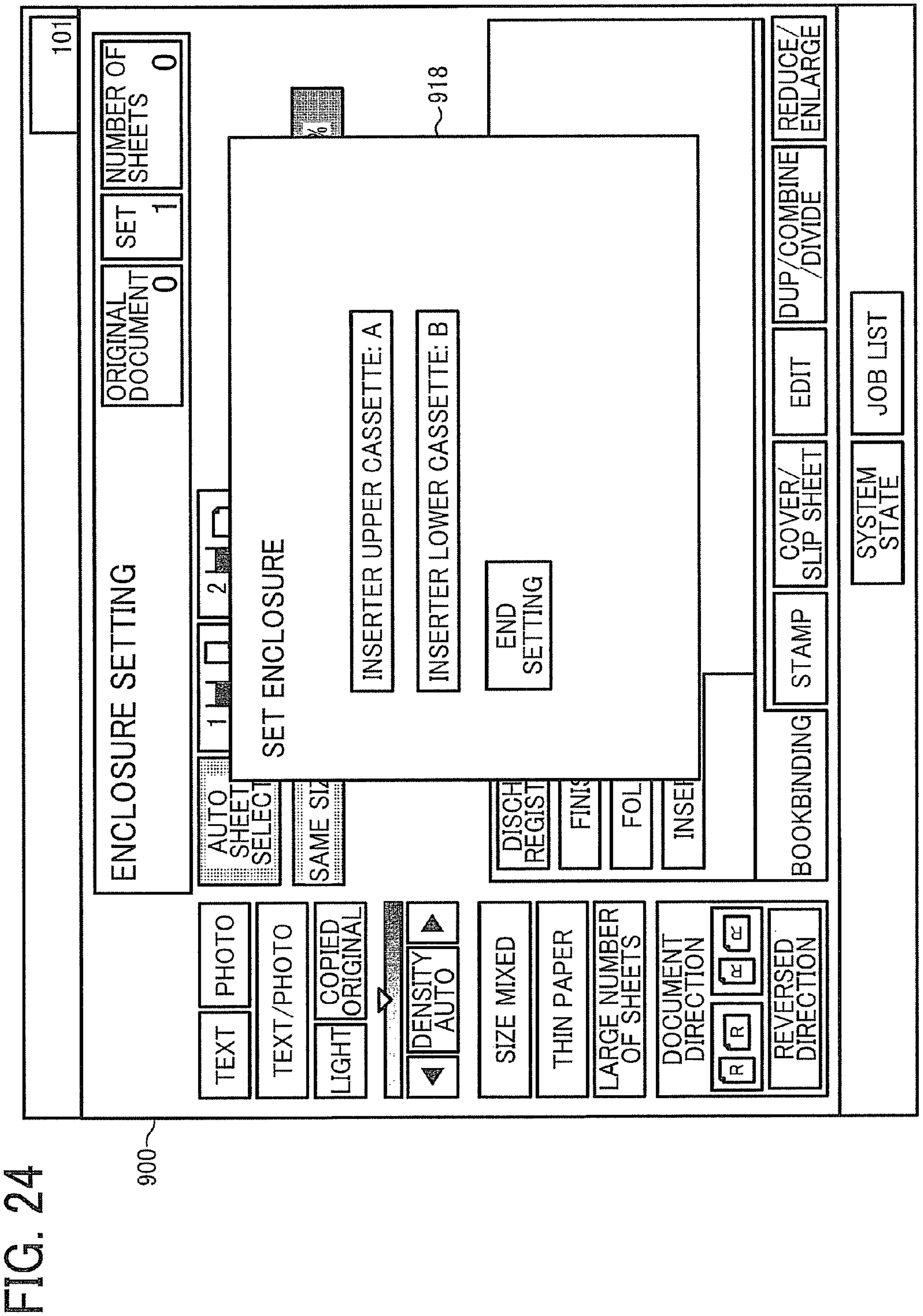
FIG. 24 illustrates an example of a screen display to prompt the user to change enclosure setting, which appears on the control panel when the inserter cassette becomes empty during printing and insertion.

FIG. 24 illustrates an example of a screen display 918 to prompt the user to change enclosure setting, which appears on the control panel 1A when the inserter cassette 201 or 202 becomes empty during printing and insertion processing.

After all the enclosures set in the inserter upper cassette 201 and the inserter lower cassettes 202 are inserted into envelopes, the screen display 918 shown in FIG. 24 appears on the display 900 to prompt the user to set enclosures necessary for unfinished insertion setting records in the inserter cassette 201 or 202 so that the processing can be continued.

In the example shown in FIG. 24, the inserter upper cassette 201 stores enclosures A, and the inserter lower cassettes 202 stores enclosures B. The insertion setting records are sorted when the job is started, and the insertion setting records in which the enclosure identification code is A or B have been already output. That is, the records of input Nos. 1, 2, 4, and 5 (hereinafter "preceding jobs") shown in Table 2 shown above are output first, and insertion of them is performed.

It is necessary to set enclosures C in the inserter cassette to output the remaining records, that is, input Nos. 3 and 6 (hereinafter "subsequent jobs") shown in Table 2. The enclosure identification code C can be set for enclosures set in the inserter cassette similarly to the method described using FIGS. 16 and 17, and thus the description thereof is omitted.

After the preceding jobs are completed, the screen display 918 prompts the user to change enclosures to be set in the inserter cassette 201 or 202. After the user inputs data of enclosures thus set in the inserter cassette 201 or 202, the subsequent jobs can be started.

It is to be noted that the screen display 918 to prompt the user to change the enclosure setting can indicate the quantity of enclosures necessary for remaining jobs.

Figure 25:
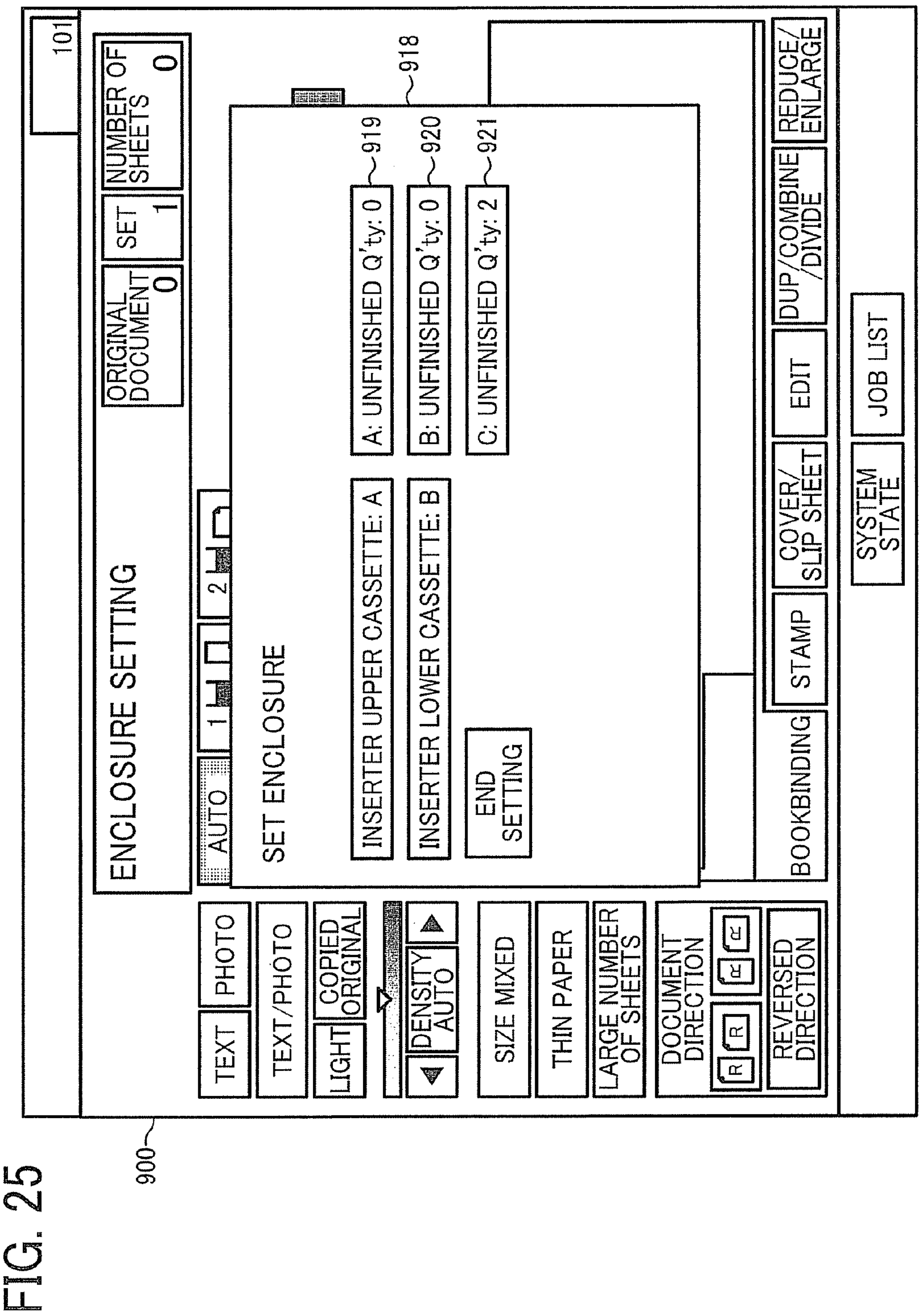
FIG. 25 illustrates an example of the screen display that can indicate the quantity of enclosures necessary for remaining jobs.

FIG. 25 illustrates an example of the screen display 918 that can indicate the quantity of enclosures necessary for unfinished records or remaining jobs.

The screen display on the control panel 1A shown in FIG. 25 prompts the user to change enclosures set in the inserter cassette after the preceding jobs are completed. As shown in FIG. 25, the screen display 918 includes fields 919, 920, and 921 indicating "A: unfinished Q'ty: 0", "B: unfinished Q'ty: 0", and "C: unfinished Q'ty: 2", respectively. In FIG. 25, "A: unfinished Q'ty: 0" in the field 919 and "B: unfinished Q'ty: 0" in the field 920 mean that the preceding jobs are completed. By contrast, "C: unfinished Q'ty: 2" in the field 921 means that the quantity of enclosures C necessary for remaining jobs is two.

With the indications of the quantity of enclosures necessary for remaining jobs, the user can recognize the quantity of enclosures to be set in the inserter cassette.

Additionally, although the necessary quantity is indicated when the display 900 prompts the user to change the enclosures set in the inserter cassette in the example shown in FIG. 25, alternatively, the necessary quantity may be indicated when the residual amount detector 203 or 204 indicates that no enclosure is present in the inserter cassette.

As described above, according to the present embodiment, the CPU 1U checks, based on the identification data input via the control panel 1A, whether the enclosure to be inserted matches enclosures P stored in the enclosure container (inserter upper cassette 201 and inserter lower cassettes 202) of the enclosure supply device 2. Then, based on the determination result, the CPU 1U controls feeding of envelopes Pf on which the image forming apparatus 1 forms images and the enclosures P from the enclosure supply device 2. In this control, insertion of the enclosures P stored in the enclosure container can be executed at a time when the identification (type) of the enclosure to be inserted matches the enclosures P set in the enclosure container, thus increasing productivity. By contrast, when the identification of the enclosure to be inserted does not match the enclosures P set in the enclosure container, the system can prompt the user to change the enclosures P set in the enclosure container with the enclosure to be inserted. After the user changes the enclosures P currently set in the enclosure container with necessary enclosures, insertion of the enclosures P newly set in the enclosure container can be executed at a time. Therefore, even when the quantity of enclosures to be inserted into a single job is greater than the quantity of enclosures set in the enclosure container, the frequency of enclosure replacement can be reduced. Additionally, it is not necessary to visually check the combination of envelopes and enclosures to be inserted into envelopes. Therefore, operability and productivity of such jobs can be increased. Moreover, it is not necessary to increase the quantity of the enclosure containers in accordance with enclosure types, thus preventing the increase in size of the system.

Additionally, when the CPU 1U determines that both the enclosure type set in the enclosure container and any enclosure type that is not set in the enclosure container are necessary, the CPU 1U initially feeds the enclosures set in the enclosure container to the insertion device 3 and causes it to insert the enclosures in envelopes. With this control, enclosures that are not set in the enclosure container can be prepared while insertion of the enclosures set in the enclosure container is executed, thus increasing operability and productivity further.

Additionally, after the enclosures P set in the enclosure container are fed to the insertion device 3, the control panel 1A displays invitation to change the enclosure P set in the enclosure container to the necessary enclosures. Thus, the user can reliably change the enclosures P set in the enclosure container, and the system can continue the job.

Additionally, the identification or type of enclosures set in the enclosure container can be selected from those displayed on the control panel 1A of the image forming apparatus 1. Thus, operability in setting of enclosure identification data or enclosure type (enclosure data) can be enhanced.

Additionally, data of enclosures contained in the enclosure container is stored in the memory unit, and the control panel 1A displays the stored data, thus eliminating the need for inputting enclosure data each time the system is activated. Then, the identification of enclosures set in the enclosure container can be reliably displayed.

Additionally, the control panel 1A can indicate the quantity of enclosures necessary for remaining records to be output when the identification of enclosures is displayed. This enables the user to check the necessary quantity for each type of enclosures at once.

Additionally, input and display of the above-described respective data as well as instructions to the enclosure supply device 2 and the insertion device 3 can be made on the control panel 1A of the image forming apparatus 1. Thus, good operability is attained.

Additionally, images to be formed on envelopes Pf into which the enclosures P are inserted can be correlated with the data of those enclosures P, and the order of image formation can be changes so that the image forming apparatus 1 can form images on enclosures of the same type in succession. This can improve operability and productivity in printing and insertion processing.

Further, when the residual quantity detectors 203 or 204 detects that the quantity of enclosures set in one of the enclosure container becomes zero, the order of image formation on envelopes can be changed so that insertion of enclosures remaining in the enclosure container can be executed. With the priorities on image formation and processing of envelopes corresponding to the enclosures remaining in the enclosure container, enclosures that are not left in the enclosure container can be prepared while image formation and processing of envelopes corresponding to the enclosures remaining in the enclosure container are executed. Thus, operability and productivity can be improved.

Additionally, image forming apparatus 1 serving as an envelope supply unit can form images on enclosures P inserted into envelopes Pf and feed the enclosures P on which images are formed to the insertion device 3. Thus, not only enclosures set in the enclosure containers but also sheets on which image forming apparatus 1 forms images can be inserted into envelopes Pf.

Numerous additional modifications and variations are possible in light of the above teachings. It is therefore to be understood that, within the scope of the appended claims, the disclosure of this patent specification may be practiced otherwise than as specifically described herein.

What is claimed is:

1. An insertion system comprising:

an enclosure supply device including an enclosure container for containing enclosures, the enclosure supply device to transport the enclosures from the enclosure container;

an envelope supply device including an envelope container for containing envelopes, the envelope supply device to transport the envelopes from the envelope container;

an insertion device to insert the enclosure supplied from the enclosure supply device into the envelope supplied from the envelope supply device;

a first input unit to input image data on the envelopes of the envelope supply device and to input identification data of the enclosure to be inserted into the envelope for a respective one of multiple insertion setting records;

a second input unit to input identification data of the enclosure set in the enclosure container of the enclosure supply device; and a controller to determine whether the identification data of the enclosure to be inserted, input by the first input unit, matches the identification data of the enclosure set in the enclosure container, input by the second input unit, and to control supply of the envelope by the envelope supply device as well as supply of the enclosure by the enclosure supply device based on a result of the determination, wherein when the identification data of the enclosure to be inserted does not match the identification data of the enclosure set in the enclosure container, an output printing order is changed.

2. The insertion system according to claim 1, wherein the envelope supply device is an image forming apparatus to form an image on the envelope and supply the envelope to the insertion device, the image forming apparatus includes a control panel, and the first input unit and the second input unit are provided to the control panel of the image forming apparatus.

3. The insertion system according to claim 2, wherein the first input unit correlates image data to be formed on the envelope with the identification data of the enclosure to be inserted in the respective one of multiple insertion setting records, and the controller changes an order of image formation on the envelope so that the image forming apparatus performs image formation in succession on identical enclosures.

4. The insertion system according to claim 1, wherein, when the controller determines that the multiple insertion setting records include both an insertion setting record in which the identification data of the enclosure to be inserted matches the identification data of the enclosure set in the enclosure container and an insertion setting record in which the identification data of the enclosure to be inserted does not match the identification data of the enclosure set in the enclosure container but is different identification data, the controller causes the enclosure supply device to preferentially supply the enclosure that is set in the enclosure container to the insertion device and the insertion device to insert the enclosure in the envelope.

5. The insertion system according to claim 4, further comprising a display unit, wherein, after the enclosures set in the enclosure container are fed to the insertion device, the controller causes the display unit to prompt a user to change the enclosure set in the enclosure container to an enclosure of the different identification data.

6. The insertion system according to claim 5, wherein the display unit displays a menu, the first input unit selects the identification data of the enclosure to be inserted from among multiple options displayed on the menu.

7. The insertion system according to claim 5, further comprising a memory unit to store the identification data of the enclosure set in the enclosure container, wherein the display unit displays the identification data of the enclosure set in the enclosure container, stored in the memory unit.

8. The insertion system according to claim 7, wherein the display unit indicates a quantity of enclosures necessary for remaining records of the multiple insertion setting records when the identification data of the enclosure set in the enclosure container is displayed.

9. The insertion system according to claim 5, wherein the envelope supply device is an image forming apparatus to form an image on the envelope and supply the envelope to the insertion device, the image forming apparatus includes a control panel, and the display unit is provided to the control panel of the image forming apparatus.

10. The insertion system according to claim 9, wherein the first input unit correlates image data to be formed on the envelope with the identification data of the enclosure to be inserted in the respective one of the multiple insertion setting records, and the controller changes an order of image formation on the envelope so that the image forming apparatus performs image formation in succession on identical enclosures.

11. The insertion system according to claim 10, wherein the enclosure supply device comprises multiple enclosure containers and multiple residual quantity detectors to detect a residual quantity of enclosures set in the multiple enclosure containers, and when one of the multiple residual quantity detectors detects that the residual quantity of enclosures set in the enclosure container becomes zero, the controller changes the order of image formation on the envelopes so that insertion of the enclosures remaining in the enclosure container is executed preferentially.

12. An insertion method comprising:

storing multiple insertion setting records in a memory unit communicably connected to a processor;

inputting image data of an image formed on an envelope;

selecting envelope type, and inputting identification data of an enclosure to be inserted in the envelope for a respective one of the multiple insertion setting records;

determining whether the identification data of the enclosure to be inserted matches identification data of enclosures set in an enclosure container for the respective one of the multiple insertion setting records; and changing an output order of the multiple insertion setting records based on whether the identification data of the enclosure to be inserted matches the identification data of the enclosures set in the enclosure container, wherein when the identification data of the enclosure to be inserted does not match the identification data of the enclosure set in the enclosure container, an output printing order is changed.

13. The insertion system according to claim 2, wherein the input image data is at least one of a postal code field, an address field, and a recipient name field.

14. The insertion system according to claim 2, wherein the input identification data is an enclosure data field.

* * * * *